United States Patent [19]

Seto et al.

[11] Patent Number: 5,091,460
[45] Date of Patent: Feb. 25, 1992

[54] COATING COMPOSITION, COATED INORGANIC HARDENED PRODUCT, AND PROCESS FOR PRODUCING THE PRODUCT

[75] Inventors: Kazuo Seto; Minoru Inoue; Motoaki Haruna, all of Osaka; Hiroshi Kimura, Tokyo; Yasutoshi Nagano, Tokyo; Yasuhiro Kushida, Tokyo, all of Japan

[73] Assignees: Toshiba Silicone Co., Ltd., Tokyo; Matsushita Electric & Works Ltd., Osaka, both of Japan

[21] Appl. No.: 618,551

[22] Filed: Nov. 27, 1990

[30] Foreign Application Priority Data

Nov. 27, 1989 [JP] Japan .................................. 1-308781
Jul. 25, 1990 [JP] Japan .................................. 2-200735
Sep. 29, 1990 [JP] Japan .................................. 2-263509

[51] Int. Cl.$^5$ ............................................. C08K 3/34
[52] U.S. Cl. .................................. 524/492; 524/588; 524/860; 528/33
[58] Field of Search ............. 528/33, 17, 18, 21, 528/23, 12, 16, 14; 524/859, 858, 860, 492, 588

[56] References Cited

U.S. PATENT DOCUMENTS

| | | |
|---|---|---|
| 4,368,235 | 1/1983 | Vaughn, Jr. ................ 524/858 |
| 4,413,088 | 11/1983 | Frye ............................ 524/858 |
| 4,496,687 | 1/1985 | Okada et al. ................ 524/859 |

Primary Examiner—John C. Bleutge
Assistant Examiner—M. Glass
Attorney, Agent, or Firm—Sughrue, Mion, Zinn Macpeak & Seas

[57] ABSTRACT

A coating composition, a coated inorganic hardened product having a cured layer formed from the coating composition, and a process for producing the coated hardened product.

a coating composition comprising the following components (A) to (C);

an organosilane oligomer solution containing silica particles dispersed therein, said solution being obtained by partially hydrolyzing a hydrolyzable organosilane represented by the formula $$R^1{}_n SiX_{4-n} \qquad (I)$$

wherein $R^1$ which may be the same or different each represents a substituted or unsubstituted monovalent hydrocarbon group having 1 to 8 carbon atoms, n is an integer of from 0 to 3, and X represents a hydrolyzable group, in a colloidal silica dispersed in an organic solvent or water, (B) a polyorganosiloxane having a silanol group in the molecule thereof, represented by the average composition formula $$R^2{}_a Si(OH)_b O_{(4-a-b)/2} \qquad (II)$$

wherein $R^2$ may be the same or different each represents a substituted or unsubstituted monovalent hydrocarbon group having 1 to 8 carbon atoms, and a and b are numbers satisfying the following equations:

$$0.2 \leq a \leq 2$$

$$0.0001 \leq b \leq 3$$

$$a+b \leq 4, \text{ and}$$

(C) a catalyst.

10 Claims, 2 Drawing Sheets

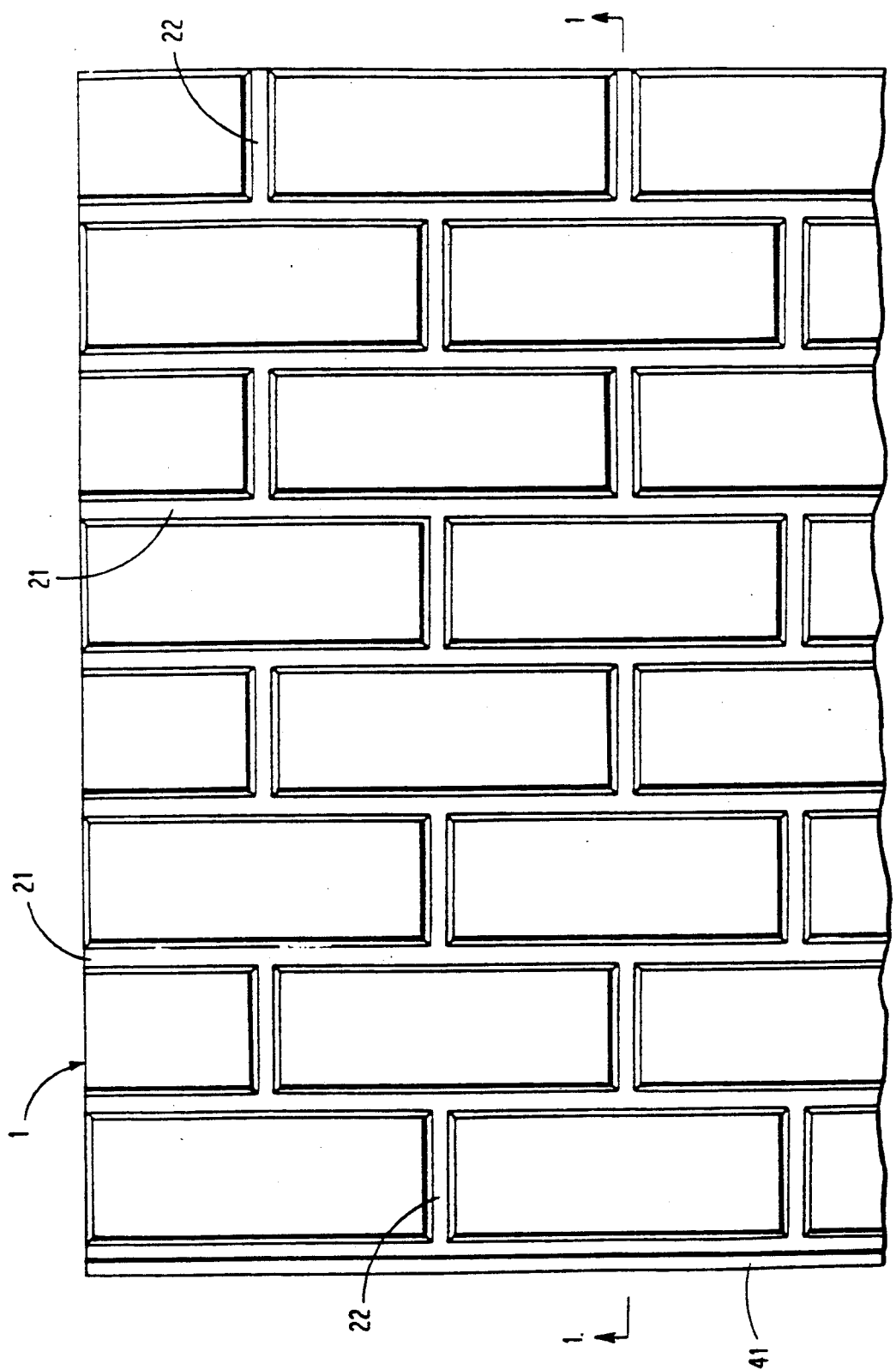

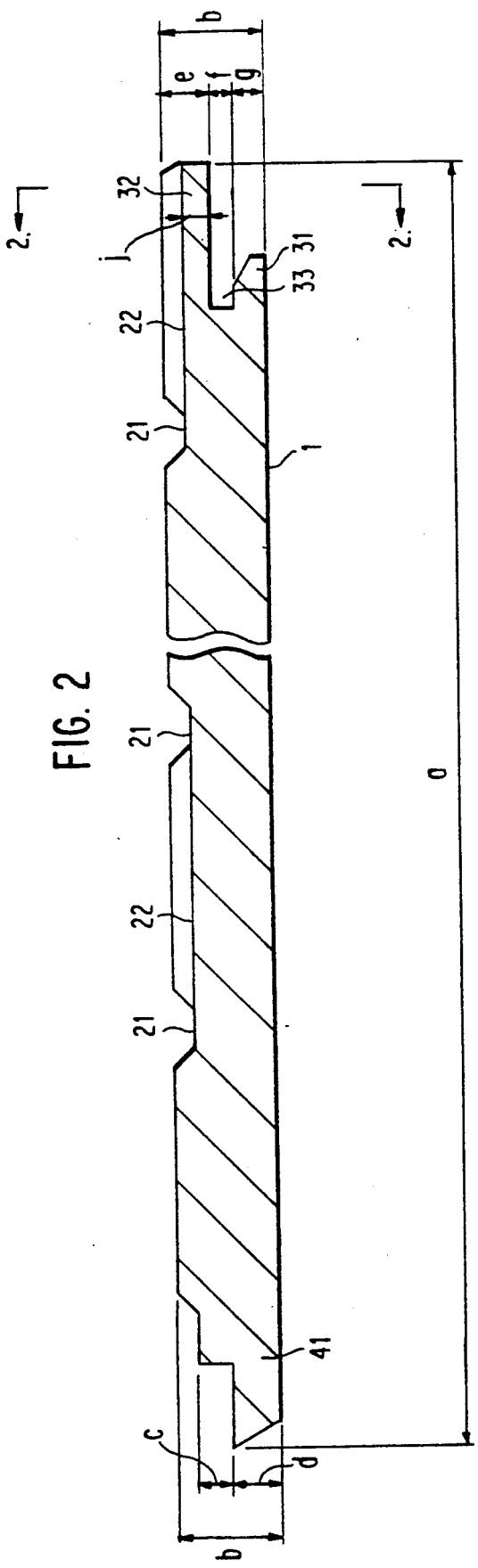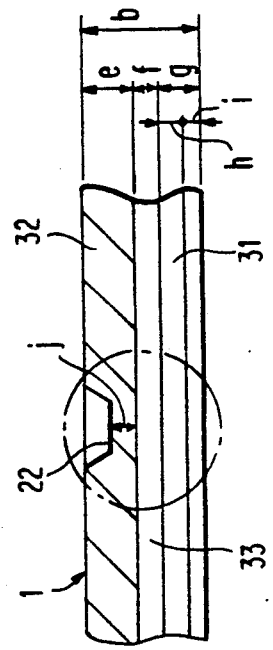

COATING COMPOSITION, COATED INORGANIC HARDENED PRODUCT, AND PROCESS FOR PRODUCING THE PRODUCT

FIELD OF THE INVENTION

The present invention relates to a coating composition, and more particularly a coating composition which, after coating on the surface of steel plates such as stainless steel plates, non-ferrous metals such as aluminum, inorganic construction materials such as concrete and slate, plastic substrates, or the like, can cure by leaving the coated composition at room temperature or heat-treating the coated composition at a relatively low temperature, and can provide a cured film having high hardness and excellent heat resistance and weatherability. The present invention further relates to a coated inorganic hardened product having a cured layer formed from the coating composition and having excellent hardness and weatherability, and to a process for producing the coated inorganic hardened product.

BACKGROUND OF THE INVENTION

Conventional coating materials which can form permanent films for the surface protection of steel plates such as stainless steel plates, non-ferrous metals such as aluminum, inorganic construction materials such as concrete and slate, plastic substrates, and the like include coating materials obtained by the hydrolysis or partial hydrolysis of hydrolyzable organosilanes and coating compositions obtained by mixing a colloidal silica with the above coating materials.

For example, JP-A-51-2736, JP-A-51-2737, JP-A-53-130732, and JP-A-63-168470 propose coating materials which are obtained from an organoalkoxysilane, a hydrolyzate of the organoalkoxysilane and/or a partial condensate of the hydrolyzate, and a colloidal silica, and in which the alkoxy groups have been converted to silanols by using an excess of water. (The term "JP-A" as used herein means an "unexamined published Japanese patent application".) These coating materials give excellent protective films having high hardness and good weatherability. However, they have a disadvantage that since baking or heat treatment should be conducted at a temperature as high as 100° C. or more or for a prolonged period of time in order to obtain desired film properties, there are cases where these coating materials are not applicable depending on the molding method for the substrate, the size and heat resistance of the substrate, or whether the coating materials are used outdoors or not. In addition, the above-proposed coating compositions have a problem that they have poor stability and tend to gel because the reactivity of the silanols formed by the hydrolysis of the alkoxysilane is so high that the silanols gradually undergo a condensation reaction even at ordinary temperature. A further defect of these coating compositions is that they cannot form pigment-containing coating paints because if a pigment is added to such coating compositions as a vehicle, the poor stability of the coating compositions becomes even worse.

JP-A-64-168 proposes a coating material comprising a partial condensation and partial hydrolysis product of an alkoxysilane and a hardener which is water and a catalyst, the hardener being added to the partial condensation and hydrolysis product just before use thereby to convert the alkoxy groups to silanols. Although such a coating material has good storage stability and is relatively stable even after a pigment is added thereto, it is disadvantageous in that baking or heat treatment should be conducted at a temperature as high as 100° C. or more or for a prolonged period of time in order to obtain desired film properties and, hence, there are cases where the coating material is not applicable depending on the shaping method for the substrate, the size and heat resistance of the substrate, or whether the coating material is used outdoors or not.

For the purpose of eliminating the above problems, JP-A-63-268772 proposes a coating material which comprises a prepolymer mainly comprising silicon alkoxide, a curing catalyst, and water, and cures around ordinary temperature. However, this coating material is defective in that it has poor coating properties and the curing properties thereof are poor and tend to be affected by moisture.

On the other hand, it is known to use silicone resins as a vehicle for heat-resistant or weather-resistant coating compositions. Most of these silicone resins comprise silanol group-containing polysiloxanes. In general, such silanol group-containing organopolysiloxanes are produced through hydrolysis of organochlorosilanes and are available as solutions in toluene or xylene. In the case of using organoalkoxysilanes as the raw material, silanol groups undergo condensation reactions until the hydrolyzates of the organoalkoxysilanes become soluble in toluene or xylene. The thus-obtained silicone resin solutions show good stability even after pigments are kneaded therewith to give coating fluids. However, they are disadvantageous in that formation of cured films necessitates high temperature and prolonged heat treatment and that a film hardness attainable even by such prolonged heat treatment is limited and insufficient for permanent films.

The above-described inorganic hardened products such as concrete and other cement-derived products are materials having excellent heat resistance and durability, but they are defective in that water penetrates into the inorganic materials if the surfaces thereof are left uncoated, and that they are poor in resistance to stains and acids. Further, the uncoated surfaces of these inorganic hardened products are not good in appearance.

Coating the surfaces of such inorganic products with organic coating compositions has been conducted to overcome the above problems. However, the organic coating compositions are disadvantageous in that they have poor weatherability and films formed therefrom tend to suffer scratches due to their low hardness.

In place of the organic coating compositions, it has been proposed to use inorganic coating materials such as waterglass-based coating materials. However, satisfactory results could not be obtained with respect to the occurrence of efflorescence and porosity.

Silicon alkoxide-based coating materials are studied as inorganic coating materials free of the above-described defects. However, use of silicon alkoxide-based coating materials has the problem of alkali generation from the cement-derived hardened product used as the substrate. Further, there is a problem that the coating tends to suffer cracking or peeling due to rain water and temperature change because the substrate shows a relatively large dimensional change and the adhesion of the coating to the substrate is insufficient. Although application of silicon alkoxide-based coating materials through primer coatings is proposed in, for example, JP-A-63-262203 and JP-A-1-83580, the silicon alkoxide-based coating material applied on the primer layer should be heat-treated at 100° C. or a higher temperature and the time period for this heat treatment is considerably long. Therefore, application of these coating materials at construction sites or application thereof on substrates having insufficient heat resistance had the tendency to cause occurrence of cracking during heat treatment. This cracking problem has also accompanied cement-derived hardened substrates if they have a tongue, a projection-depression pattern, or the like and have a small-thickness portion therein.

SUMMARY OF THE INVENTION

As a result of intensive studies to overcome the problems accompanying the above-described conventional coating materials, it has now been found that a coating composition comprising a silica-dispersed oligomer solution obtained by partially hydrolyzing an alkoxysilane in a colloidal silica dispersed in an organic solvent or water, and further comprising a silanol group-containing polyorganosiloxane and a catalyst can eliminate all of the problems of the conventional coating materials. The present invention has been completed based on this finding.

As a result of further intensive studies to eliminate the problems of the conventional coated inorganic hardened products described above, it has now been found that all those problems can be overcome by applying the coating composition comprising a silica-dispersed oligomer solution obtained by partially hydrolyzing an alkoxysilane in a colloidal silica dispersed in a medium, a silanol group-containing polyorganosiloxane, and a catalyst, on a substrate such as a cement-derived hardened substrate through a primer layer to form a cured coating film. The present invention has been also completed based on the above.

An object of the present invention is to provide (i) a coating composition which can be dried and cured at ordinary temperature or can be subjected to accelerated heat curing at relatively low temperatures, and which gives a cured film having high hardness, excellent weatherability, and good smoothness;

(ii) a coating composition which can be used as a stable vehicle to produce a pigmented coating fluid and which, therefore, can give an arbitrarily colored cured film having excellent weatherability, smoothness, and gloss; and (iii) a coating composition which has so good storage stability that the performances of (i) above can be obtained in a stable manner over a prolonged period of time.

Another object of the present invention is to provide a coated inorganic hardened product such as a coated concrete or cement-derived product or the like, having an inorganic coating layer which is a cured layer of a silicon alkoxide-based inorganic coating material, has a high hardness and excellent weatherability, and is free of cracking or peeling for a prolonged period of time. In producing the coated inorganic hardened product, the application of the coating material can be done even at a construction site, and even a substrate having insufficient heat resistance or a substrate having a tongue or a projection-depression pattern and having a small-thickness portion therein can also be coated with the coating material without the fear of cracking.

Still another object of the present invention is to provide a process for producing the coated inorganic hardened product.

BRIEF DESCRIPTION OF THE DRAWINGS

FIG. 1 is a partial plan view of the inorganic hardened product used in Examples 36 to 46 and Comparative Examples 7 and 8;

FIG. 2 is a partial sectional view taken on line A—A of FIG. 1; and

FIG. 3 is a partial sectional view taken on line B—B of FIG. 2.

DETAILED DESCRIPTION OF THE INVENTION

The coating composition in accordance with the present invention comprises the following components (A) to (C) to obtain the performances of (i) above;

(A) an organosilane oligomer solution containing silica particles dispersed therein, the solution being obtained by partially hydrolyzing a hydrolyzable organosilane represented by the formula

$$R^1{}_n SiX_{4-n} \qquad (I)$$

wherein $R_1$ which may be the same or different each represents a substituted or unsubstituted monovalent hydrocarbon group having 1 to 8 carbon atoms, n is an integer of from 0 to 3, and X represents a hydrolyzable group, in a colloidal silica dispersed in an organic solvent or water, (B) a polyorganosiloxane having a silanol group in the molecule thereof, represented by the average composition formula

$$R^2{}_a Si(OH)_b O_{(4-a-b)/2} \qquad (II)$$

wherein $R^2$ which may be the same or different each represents a substituted or unsubstituted monovalent hydrocarbon group having 1 to 8 carbon atoms, and a and b are numbers satisfying the following equations:

$$0.2 \leq a \leq 2$$

$$0.0001 \leq b \leq 3$$

$$a+b \leq 4, \text{ and}$$

(C) a catalyst.

In one embodiment of the present invention for obtaining the performance of (ii) above, component (B) in the coating composition has a weight-average molecular weight of from 700 to 20,000 in terms of the weight-average molecular weight of polystyrene.

In another embodiment of the present invention for obtaining the performance of (iii) above, component (A) in the coating composition has a pH of from 2.0 to 7.0.

The coated inorganic hardened product in accordance with the present invention comprises an inorganic hardened product, a primer layer formed on the surface thereof, and provided on the primer layer a film which is a cured layer of the coating composition of the present invention described above.

The process for producing the coated inorganic hardened product in accordance with the present invention comprises the first step of forming a primer layer on the surface of an inorganic hardened product, and the second step of forming an inorganic coating layer by coating on the primer layer the above-described coating composition of the present invention and then drying the coated coating composition at ordinary temperature or under low-temperature heating.

The silica-dispersed oligomer in component (A) used in the present invention has hydrolyzable group (X) as a functional group which takes part in a curing reaction during film formation, and is the major ingredient for forming a base polymer. This oligomer is obtained by adding one or more hydrolyzable organosilanes represented by the formula (I) to a colloidal silica dispersed in an organic solvent or water (including a mixed solvent of an organic solvent(s) and water), and partially hydrolyzing the hydrolyzable organosilane(s) with the water contained in the colloidal silica or with water added separately.

$R^1$ in the hydrolyzable organosilane represented by the formula (I) represents a substituted or unsubstituted monovalent hydrocarbon group having 1 to 8 carbon atoms. Examples thereof include an alkyl group such as methyl, ethyl, propyl, butyl, pentyl, hexyl, heptyl or octyl; a cycloalkyl group such as cyclopentyl or cyclohexyl; an aralkyl group such as 2-phenylethyl, 2-phenylpropyl or 3-phenylpropyl; an aryl group such as phenyl or tolyl; an alkenyl group such as vinyl or allyl; a halogen-substituted hydrocarbon group such as chloromethyl, γ-chloropropyl or 3,3,3-trifluoropropyl; other substituted hydrocarbon groups such as γ-methacryloxypropyl, γ-glycidoxypropyl, 3,4-epoxycyclohexylethyl, and γ-mercaptopropyl; and the like. Of these, an alkyl group having 1 to 4 carbon atoms and phenyl group are preferred from the standpoint of easy synthesis or availability of the organosilane.

Examples of the hydrolyzable group X include an alkoxy group, acetoxy group,
an oxime group

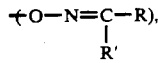

an enoxy group

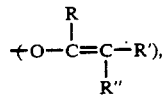

an amino group, an aminoxy group

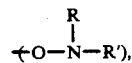

an amido group

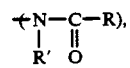

and the like.

(In the above structural formulae, R, R' and R" each (In the above represents, for example, hydrogen, a monovalent hydrocarbon group, or the like.) The hydrolyzable group X preferably is an alkoxy group from the standpoints of easy availability of the organosilane and easiness of the preparation of the silica-dispersed oligomer solution.

Examples of the hydrolyzable organosilane represented by the formula (I) in which n is an integer of 0 to 3 include mono-, di-, tri-, and tetra-functional alkoxysilanes, acetoxysilanes, oximesilanes, enoxysilanes, aminosilanes, aminoxysilanes, amidosilanes, and the like. Of these, alkoxysilanes are preferred from the standpoints of easy availability of the silane and easiness of the preparation of the silica-dispersed organosilane oligomer solution.

Specific examples of tetraalkoxysilanes of the formula (I) where n=0 include tetramethoxysilane, tetraethoxysilane, and the like. Specific examples of organotrialkoxysilanes of the formula (I) where n=1 include methyltrimethoxysilane, methyltriethoxysilane, methyltriisopropoxysilane, phenyltrimethoxysilane, phenyltriethoxysilane, 3,3,3-trifluoropropyltrimethoxysilane, and the like. Specific examples of diorganodialkoxysilanes of the formula (I) where n=2 include dimethyldimethoxysilane, dimethyldiethoxysilane, diphenyldimethoxysilane, diphenyldiethoxysilane, methylphenyldimethoxysilane, and the like. Specific examples of triorganoalkoxysilanes of the formula (I) where n=3 include trimethylmethoxysilane, trimethylethoxysilane, trimethylisopropoxysilane, dimethylisobutylmethoxysilane, and the like. Examples of the alkoxysilanes further include organosilane compounds generally called silane coupling agents.

It is preferred that 50 mol % or more of the hydrolyzable organosilane represented by the formula (I) be a trifunctional organosilane or trifunctional organosilanes of the the formula (I) in which n=1. More preferably, the trifunctional organosilane content in the hydrolyzable organosilane represented by the formula (I) is 60 mol % or more, and most preferably, the content is 70 mol % or more. If the content thereof is below 50 mol %, the resulting coating composition cannot give a cured film having a sufficient film hardness and tends to show poor drying and curing properties.

The colloidal silica contained in component (A) is essential to improve the hardness of the cured film obtained from the coating composition of the present invention. A colloidal silica dispersed in water or in a nonaqueous organic solvent such as an alcohol as such a colloidal silica is used. Such colloidal silica in general has a solid silica content of from 20 to 50% by weight, and the amount of a colloidal silica used can be determined based on its solid silica content. In the case of using a colloidal silica dispersed in water, the water present as the component other than the solid components can be used for the hydrolysis of the organosilicon compound to prepare component (A). Such colloidal silica dispersed in water is normally produced from waterglass, and colloidal silica of this type is easily commercially available. On the other hand, colloidal silica dispersed in an organic solvent can be easily prepared by replacing the water in the water-dispersed colloidal silica with an organic solvent. Such organic solvent-dispersed colloidal silica is also easily commercially available. Examples of the organic solvent which can be used as the medium in which colloidal silica is dispersed include lower aliphatic alcohols such as methanol, ethanol, isopropanol (hereinafter often referred to as "IPA"), n-butanol, and isobutanol; ethylene glycol and its derivatives such as ethylene glycol monobutyl ether and ethylene glycol monoethyl ether acetate; diethylene glycol and its derivatives such as diethylene glycol monobutyl ether; diacetone alcohol; and the like. These solvents may be used alone or as a mixture of two or more thereof. In combination with these hydrophilic organic solvents, toluene, xylene, ethyl acetate, butyl acetate, methyl ethyl ketone, methyl isobutyl ketone, methyl ethyl ketoxime, and the like may be used.

Component (A) contains a colloidal silica in an amount of preferably from 5 to 95% by weight, more preferably from 10 to 90% by weight, and most preferably from 20 to 85% by weight, in terms of the silica content in component (A). If this content is below 5% by weight, the desired film hardness cannot be obtained. If the silica content exceeds 95% by weight, it becomes difficult to uniformly disperse the silica particles, and causes problems such as gelation of component (A).

The silica-dispersed oligomer solution, component (A), can normally be obtained by partially hydrolyzing the hydrolyzable organosilane in a water-dispersed colloidal silica or in an organic solvent-dispersed colloidal silica. The amount of water used preferably is from 0.001 to 0.5 mole per mole of the hydrolyzable group (X) in the hydrolyzable organosilane. If the amount of water is below 0.001 mole, a sufficiently partially hydrolyzed product cannot be obtained. If the amount thereof exceeds 0.5 mole, the resulting partial hydrolyzate may have poor stability. The method for the partial hydrolysis is not particularly limited. For example, the hydrolyzable organosilane is mixed with a colloidal silica, and a required amount of water is added thereto, whereby a partial hydrolysis reaction proceeds at ordinary temperature. The reaction mixture may be heated at 60 to 100° C. to accelerate the partial hydrolysis reaction. For the purpose of further accelerating the partial hydrolysis reaction, an organic or inorganic acid may be used as a catalyst, such as hydrochloric acid, acetic acid, a halogenated silane, chloroacetic acid, citric acid, benzoic acid, dimethylmalonic acid, formic acid, propionic acid, glutaric acid, glycolic acid, maleic acid, malonic acid, toluenesulfonic acid, oxalic acid, or the like.

In order to exhibit the desired performance of component (A) in a stable manner over a prolonged period of time, the pH of component (A) is adjusted to 2.0 to 7.0, preferably 2.5 to 6.5, more preferably 3.0 to 6.0. If the pH of component (A) is outside this range, the performance of component (A) considerably deteriorates in a prolonged period of time especially when the amount of water used was 0.3 mole or more per mole of X in the hydrolyzable organosilane used. If the pH of component (A) is outside of and on the acidic side of the preferred pH range specified above, pH adjustment is conducted using a basic reagent such as ammonia, ethylenediamine, or the like. If the pH of component (A) is outside of and on the basic side of the preferred range, pH adjustment is conducted using an acid reagent such as hydrochloric acid, nitric acid, acetic acid, or the like. Methods for this pH adjustment are not particularly limited.

The silanol group-containing polyorganosiloxane, component (B), is an important ingredient in the present invention. This component (B) can be represented by the average composition formula $$R^2_a Si(OH)_b O_{(4-a-b)/2} \quad (II)$$

wherein $R^2$ which may be the same or different each represents a substituted or unsubstituted monovalent hydrocarbon group having 1 to 8 carbon atoms, and a and b are numbers satisfying the following equations:
$0.2 \leq a \leq 2$
$0.0001 \leq b \leq 3$
$a + b \leq 4$ Examples of $R^2$ in the above formula (II) include the same groups as $R^1$ in the formula (I) described above. Preferred of those are an alkyl group having 1 to 4 carbon atoms, phenyl group, vinyl group, and a substituted hydrocarbon group such as γ-glycidoxypropyl group, γ-methacryloxypropyl group, γ-aminopropyl group, and 3,3,3-trifluoropropyl group. Of these, methyl and phenyl are more preferred. In the above formula (II), a and b respectively are numbers satisfying the equations described above. If a is smaller than 0.2 or b is larger than 3, a cured film obtained from the resulting coating composition develops cracks disadvantageously. If a is larger than 2 and not larger than 4 or b is smaller than 0.0001, curing of the resulting coating composition cannot proceed satisfactorily.

Such a silanol group-containing polyorganosiloxane can, for example, be obtained by hydrolyzing one or more silanes selected from methyltrichlorosilane, dimethyldichlorosilane, phenyltrichlorosilane, diphenyldichlorosilane, and alkoxysilanes corresponding thereto with a large quantity of water according to the conventional method. In the case of hydrolyzing an alkoxysilane to produce a silanol group-containing polyorganosiloxane by the conventional method, a slight proportion of the alkoxy groups may remain unhydrolyzed. That is, a polyorganosiloxane containing both silanol groups and a very slight amount of alkoxy groups may be obtained. Such a polyorganosiloxane can also be used in the present invention.

The curing catalyst, component (C), used in the coating composition of the present invention serves to accelerate the condensation reaction between components (A) and (B), thereby curing the coating film. Examples of the catalyst include alkyl titanates; carboxylic acid metal salts such as tin octylate, dibutyltin dilaurate, and dioctyltin dimaleate; amine salts such as dibutylamine-2-hexoate, dimethylamine acetate, and ethanolamine acetate; quaternary ammonium salts of carboxylic acids such as tetramethylammonium acetate; amines such as tetraethylpentamine; amine-type silane coupling agents such as N-β-aminoethyl-γ-aminopropyltrimethoxysilane and N-β-aminoethyl-γ-aminopropylmethyldimethoxysilane; acids such as p-toluenesulfonic acid, phthalic acid, and hydrochloric acid; alkali catalysts such as aluminum compounds including aluminum alkoxides and aluminum chelates, and potassium hydroxide; titanium compounds such as tetraisopropyl titanate, tetrabutyl titanate, and titanium tetraacetylacetonate; halogenated silanes such as methyltrichlorosilane, dimethyldichlorosilane, and trimethylmonochlorosilane; and the like. However, a catalyst other than the above can be used without any particular limitation so long as the catalyst used is effective in accelerating the condensation reaction between components (A) and (B).

The amounts of components (A) and (B) added to the coating composition of the present invention are preferably from 1 to 99 parts by weight and from 99 to 1 parts by weight, respectively, the sum of components (A) and (B) being 100 parts by weight. The amounts of components (A) and (B) are more preferably from 5 to 95 parts by weight and from 95 to 5 parts by weight, respectively, and most preferably from 10 to 90 parts by weight and from 90 to 10 parts by weight, respectively. If the amount of component (A) is below 1 part by weight, the resulting coating composition is poor in curing properties at ordinary temperature and cannot give a cured film having a sufficient hardness. If the amount of component (A) exceeds 99 parts by weight, the coating composition has unstable curing properties and does not give a cured film having desired properties.

The amount of component (C) added to the coating composition of the present invention is preferably from 0.0001 to 10 parts by weight, more preferably from 0.0005 to 8 parts by weight, most preferably from 0.0007 to 5 parts by weight, per 100 parts by weight of the sum of components (A) and (B). If the amount of component (C) is below 0.0001 part by weight, there are cases where the coating composition does not cure at ordinary temperature. On the other hand, the amount of component (C) exceeding 10 parts by weight may result in a cured film having impaired heat resistance and weatherability.

Hydrolyzable groups contained in the oligomer in the silica-dispersed oligomer solution, component (A), undergo a condensation reaction with silanol groups contained in component (B) in the presence of the curing catalyst, component (C), at ordinary temperature or under heating at relatively low temperature (e.g., 100° C. or less), thereby forming a cured film. Therefore, unlike moisture-curing coating compositions, the coating composition of the present invention is not substantially affected by moisture even when cured at ordinary temperature. Further, the condensation reaction for forming a cured film can be accelerated by heat treatment.

In the case where a pigment is added to the coating composition of the present invention to prepare a pigmented coating fluid, the polyorganosiloxane, component (B), preferably has a molecular weight of from 700 to 20,000. Molecular weight herein means the weight-average molecular weight of relevant standard polystyrene as measured by GPC (gel permeation chromatography). If the molecular weight of component (B) is below 700, a coating film formed from the resulting coating composition cures too slowly and tends to develop cracks. If the molecular weight thereof exceeds 20,000, a coating film formed from the pigmented coating composition has poor gloss and also poor smoothness. It should, however, be noted that in order to impart high gloss and improved smoothness to the coating film formed from the pigmented coating composition in which component (B) has a weight-average molecular weight larger than 10,000 but not larger than 20,000, it is required to suitably select pigment-dispersing conditions and/or additives. For example, preferred pigment dispersion conditions include an increased revolution number of the mixing means during dispersing operation and a prolonged treating time for dispersion. Further, an additive such as a coupling agent or an auxiliary dispersant ca be used in an amount of 0.3% by weight or more based on the weight of the pigment, although the amount of the additive varies depending on its kind.

Preferred examples of the pigment include organic pigments such as carbon black, quinacridone, Naphthol Red, Cyanine Blue, Cyanine Green, Hansa Yellow, and the like, and inorganic pigments such as titanium oxide, barium sulfate, red iron oxide, complex metal oxides, and the like. These can be used alone or in combination of two or more thereof. The amount of pigments added cannot be specified unconditionally because hiding power differs depending on the kind of pigment. Generally, however, the amount of pigments added is preferably from 5 to 80 parts by weight per 100 parts by weight, on a dry basis, of the sum of components (A) and (B). If the pigment amount is below 5 parts by weight, sufficient hiding power cannot be produced, while the amount thereof exceeding 80 parts by weight may result in a coating film having poor smoothness.

Dispersing the pigment can be conducted by the conventional method, and a dispersing agent, auxiliary dispersant, thickener, coupling agent, and other additives are used. In addition, a leveling agent, dye, metal powder, glass powder, antioxidant, ultraviolet absorber, and the like is also added.

In order to make the handling of the coating composition of the present invention easy, an organic solvent selected from various kinds is used to dilute the coating composition before use. The kind of solvent can be selected according to the kind of the monovalent hydrocarbon groups contained in component (A) or (B) and the molecular weight of the oligomer and polymer contained in the composition. Examples of the organic solvent include the same examples as for the solvent in which a colloidal silica is dispersed. One or more solvents selected from those is used to dilute the coating composition of the present invention. In combination with such hydrophilic organic solvent(s), toluene, xylene, ethyl acetate, butyl acetate, methyl ethyl ketone, methyl isobutyl ketone, methyl ethyl ketoxime, or the like can used.

In general, the above-described components (A), (B), and (C) are stored separately as a three-pack system. However, a mixture of components (A) and (C) may be stored separately from component (B), as a two-pack system, and the two packs are mixed before use. Alternatively, all the components (A), (B), and (C) may be mixed and stored in a single package as a one-pack system. In the case where components (A) and (C) are mixed and stored in the same package, it is preferred that the pH of component (A) be adjusted to 2 to 7 before component (C) is added thereto, and that in preparing component (A), the amount of water used be 0.3 mole or less per mole of the hydrolyzable group X contained in the organosilane.

The coating composition of the present invention can also be used for the surface protection of various materials including plastics such as polycarbonate resins, acrylic resins, and ABS resins, metals such as aluminum, stainless steel, copper, iron, and duralumin, paper, wood, glass, wall materials made from cement, gypsum, or the like, and coating films of acrylic, alkyd, polyester, epoxy, or urethane resins.

The thickness of the coating film formed from the coating composition of the present invention is not particularly limited, and is generally within the range of from 0.1 to 100 μm. However, in order that the coating film retains good adhesion to the substrate over a prolonged period of time and is prevented from cracking or peeling, the thickness of the coating film is preferably from 1 to 80 μm, more preferably from 1 to 50 μm.

The coating composition of the present invention can be coated by conventional methods. For example, suitable method can be selected from various coating methods such as brushing, spraying, dip coating, flow coating, roll coating, curtain coating, knife coating, and others. Dilution of the coating composition with an organic solvent is not especially limited, and a suitable dilution is determined according to need.

If required and necessary, a leveling agent, thickener, pigment, dye, aluminum paste, glass frit, metal powder, antioxidant, ultraviolet absorber, and the like can be added to the coating composition of the present invention in the manner such that the additives used do not adversely affect the present invention.

One example of the inorganic hardened product which can be used in the present invention is as follows. The hydraulic inorganic binder material as a raw material for the inorganic hardened product is not particularly limited, and one or more materials selected from portland cement, blast furnace cement, blast furnace slag, calcium silicate, gypsum, and the like can be used as the binder material.

An inorganic filler, fibrous material, and the like are usually added to such a binder material. Although such fillers and reinforcements are not particularly limited, the inorganic fillers include fly ash, micro silica, silica sand, etc., and the fibrous materials include pulp, synthetic fibers, inorganic fibers such as asbestos, metal fibers such as steel fibers, etc. These can be used alone or in combination of two or more thereof.

A raw material paste comprising the above-described ingredients is molded by a suitable molding method such as extrusion molding, cast molding, paper-making molding, press molding, or the like, and then cured to give an inorganic hardened product. The curing method is not particularly limited, but autoclave curing, steam curing, ordinary temperature curing, or the like is suitably used.

The thus-obtained inorganic hardened product preferably has a bulk density of 0.5 g/cm$^3$ or more and a dimensional change from the water-saturated state to the absolute dry state of 0.5% or less. More preferably, the bulk density thereof is 0.7 g/cm$^3$ or more and the dimensional change thereof is 0.4% or less. If the bulk density thereof is below 0.5 g/cm$^3$, a primer and the coating composition of the present invention (silicon alkoxide-based coating material) penetrate so severely into the inorganic hardened product that not only the resulting coating film is difficult to exhibit good adhesion but also there is a fear of poor appearance of the coating film. If the dimensional change of the inorganic hardened product exceeds 0.5%, the coating film formed from the silicon alkoxide-based coating material cannot sufficiently follow up the movement of the substrate even if the primer layer can follow up, and this tends to cause cracking or peeling.

Prior to the application of a primer composition on a substrate, sealing may be conducted with a sealer which is a solvent-based type, an aqueous solution, or an emulsion type according to the kind of the substrate, thereby controlling the penetration of the primer composition and coating composition into the substrate surface. Sealers which can be used are not particularly limited, and acrylic sealers, latex sealers, etc., can be used.

The coating layer formed on the inorganic hardened product can have various constitutions. For example, the coating layer may comprise a primer layer formed from a primer composition containing a colorant such as a pigment and a clear inorganic coating layer formed on the primer layer, or may comprise a primer layer containing no colorant such as a pigment and, provided on the primer layer, an inorganic coating layer containing a colorant such as a pigment. It is also possible to further provide a clear inorganic coating layer on the colored inorganic coating layer. A suitable constitution of the coating layer is selected according to use of the coated inorganic hardened product to be produced. In the case where an inorganic coating layer containing a colorant such as a pigment is formed as a topcoat and the coating film is desired to be glossy, it is preferred that component (B) has a weight-average molecular weight of from 700 to 20,000 in terms of the weight-average molecular weight of polystyrene, as described above.

The primer layer is described below. This primer layer is, for example, formed from a primer composition which is a mixture of the following components (a) to (d);

(a) 100 parts by weight of an isocyanate prepolymer containing at least two isocyanate groups per molecule but containing no urethane bond, (b) from 1 to 100 parts by weight of an organosilicon compound containing at least one mercapto group and at least two alkoxy groups per molecule, (c) 100 parts by weight or less, on a dry basis, of an epoxy resin-modified silicone resin, and (d) from 0.01 to 30 parts by weight of an organotin compound and/or a tin salt of an organic acid.

Preferably, the isocyanate prepolymer (a), which contains at least two isocyanate groups per molecule but contains no urethane bond, is such that the isocyanate groups are not directly bonded to a benzene ring. The above-described primer composition may further contain the pigments such as described before.

An isocyanate group is generally a reactive group which reacts with a hydroxyl group, water, etc., to form a chemical bond of the urethane type, urea type, etc. Therefore, the isocyanate prepolymer (a) having such isocyanate groups reacts with hydroxyl groups, etc., on the surface of the substrate to form chemical bonds, thereby forming a tenacious film. Examples of such an isocyanate prepolymer include partial hydrolyzates or trimers of isocyanates such as hexamethylene diisocyanate, tolylene diisocyanate, m-xylylene diisocyanate, tris(2-hydroxyethyl) isocyanate, and the like, and reaction product of mixtures of these isocyanates.

From the standpoint of weatherability, the isocyanate prepolymer to be used as a constituent of the primer composition used in the present invention should contain at least two isocyanate groups per molecule but contain no urethane bond. Examples of such an isocyanate prepolymer include compounds containing a buret bond, such as (1) and (2) given below, compounds containing an isocyanurate ring, such as (3) to (6) given below, and the like.

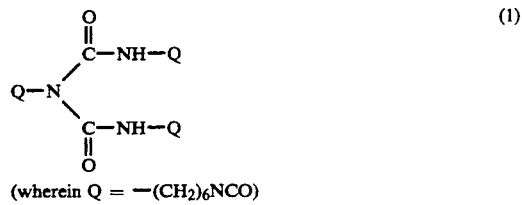

(wherein Q = —(CH$_2$)$_6$NCO)

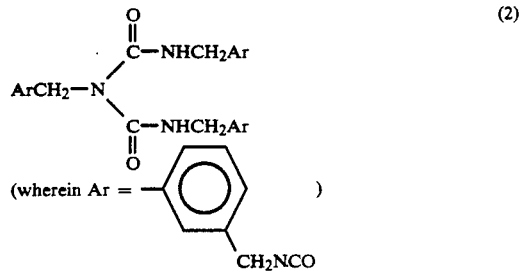

(wherein Ar = —⌬—CH$_2$NCO )

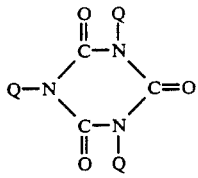

(wherein Q is the same as in formula (1))

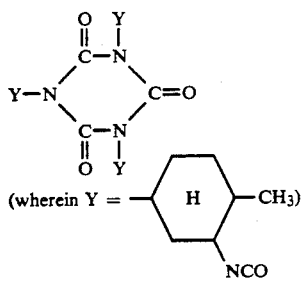

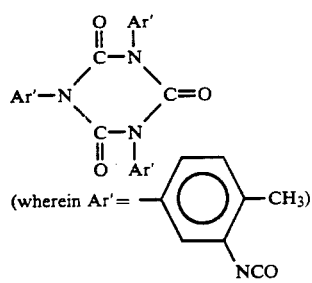

These can be used alone or in combination of two or more thereof. In the case where the primer layer to be formed is particularly required not to suffer discoloration by light, it is preferred that the isocyanate groups contained in the prepolymer be not directly bonded to a benzene ring.

The organosilicon compound (b) containing at least one mercapto group and at least two alkoxy groups per molecule is a silane coupling agent containing, in the same molecule thereof, both a mercapto group as an organic functional group to be bonded to an organic material and an alkoxy group as a hydrolyzable group to react with an inorganic material. This organosilicon compound (b) thus acts as an adhesion improver. The component (b) also serves to impart toughness and excellent weatherability to the primer layer through reactions with other ingredients in the primer composition, i.e., the above-described isocyanate prepolymer (a) and the epoxy resin-modified silicone resin (c) described later. Examples of the organosilicon compound (b) include silanes such as $HS(CH_2)_3Si(OCH_3)_3$, $HS(CH_2)_3Si(OC_2H_5)_3$, $HS(CH_2)_2Si(OCH_3)_3$, $HS(CH_2)_2Si(OC_2H_5)_3$, $HS(CH_2)_3Si(CH_3)(OCH_3)_2$, and the like, and products of the hydrolysis and condensation of these silanes. These can be used alone or in combination of two or more thereof.

The amount of the above-described organosilicon compound (b) added to the primer composition varies depending on the viscosity of the prepolymer (a), etc., but is generally from 1 to 100 parts by weight, preferably from 3 to 50 parts by weight, per 100 parts by weight of the prepolymer (a). If the amount of component (b) is below 1 part by weight, the resulting primer layer has insufficient adhesion and may also have poor film strength. If the amount of component (b) exceeds 100 parts by weight, the adhesion of the primer layer rather tends to deteriorate.

The epoxy resin-modified silicone resin (c) serves to improve the adhesion and ultraviolet light resistance of the primer layer, although the objects of the present invention are fully accomplished even if this component (c) is not added to the primer composition.

The proportion of the silicone resin ingredient to the epoxy resin ingredient in the epoxy resin-modified silicone resin (c) is arbitrary and not particularly limited. However, it is preferred that the content of the silicone resin ingredient be from 15 to 70% by weight and the content of the epoxy resin ingredient be from 30 to 85% by weight, based on the total weight of the modified resin, from the standpoint of balancing adhesion, water resistance, and weatherability. Normally, the silicone resin ingredient preferably is a polyorganosiloxane comprising polyfunctional siloxane units and represented by the average formula $$[R^3{}_hSi(OR^4)_iO_j]_k \qquad (III)$$

wherein $R^3$ is a monovalent hydrocarbon group, $R^4$ is hydrogen atom or a monovalent hydrocarbon group, h is a number of from 1.0 to 1.7, i is a number of from 0.05 to 0.2, j is a number defined by (4-h-i)/2, and k is a number of 2 or larger.

Examples of the hydrocarbon group of $R^3$ in the above formula (III) include an alkyl group such as methyl, ethyl, propyl, butyl, hexyl or octyl, an alkenyl group such as vinyl or allyl, an aryl group such as phenyl, and the like. However, the groups of $R^3$ preferably are a combination of methyl and phenyl, i.e., the silicone resin ingredient preferably is polymethylphenylsiloxane, because such a silicone resin shows excellent water resistance and weatherability, has good compatibility with epoxy resins, and can be easily synthesized. Examples of $R^4$ include hydrogen, methyl, ethyl, propyl, butyl, and the like.

In the above formula (III), h preferably is a number of 1.0 to 1.7, and i preferably is a number of 0.05 to 0.2. If h is smaller than 1.0, the polyorganosiloxane with an appropriate degree of polymerization tends to have poor compatibility with epoxy resins. If h is larger than 1.7, there is a fear that a resin film formed from the resulting primer composition may have poor toughness. If i is smaller than 0.05, the resin films have poor toughness, while if i is larger than 0.2, the resulting primer composition tends to suffer a viscosity increase or gelation during storage. Further, k preferably is a number of 2 or more, from the standpoints of film-forming properties and storage stability.

The epoxy resin ingredient in component (c) is a low or high polymer having a moiety of a compound containing an oxirane oxygen such as glycidyl group, 3,4-oxycyclohexyl group, or the like. A hardener selected from various acid anhydrides, amines, etc., can be used.

Such hardeners are not particularly limited, and hardeners used for general-purpose epoxy resins can be used. However, in order that the hardener be stably present in a solution together with the other ingredients and that curing be initiated around room temperature to form films, it is recommended to use an acid anhydride as the hardener. Examples of such an acid anhydride include phthalic anhydride, maleic anhydride, hexahydrophthalic anhydride, pyromellitic anhydride, trimellitic anhydride, dodecylsuccinic anhydride, and the like. These can be used alone or in combination of two or more thereof.

The epoxy resin-modified silicone resin can be obtained by merely mixing the above-described silicone resin ingredient and epoxy resin ingredient in the proportions such that both ingredients retain compatibility with each other. Alternatively, the modified resin can be obtained by forming chemical bonds between the two ingredients by heating. Such a blend or reaction product is normally used in the form of a solution in an organic solvent such as toluene, xylene, etc.

The amount of the thus-obtained epoxy resin-modified silicone resin (c) added to the primer composition is generally 100 parts by weight or less, preferably from 3 to 50 parts by weight, on a dry basis per 100 parts by weight of the isocyanate prepolymer (a). If the amount of component (c) exceeds 100 parts by weight, not only there is a fear that the weatherability and adhesion properties of the primer layer deteriorate but the stability of the primer composition deteriorates.

Component (d), i.e., an organotin compound and/or an organic acid tin salt, catalyzes the reactions of the isocyanate groups, alkoxysilyl groups, silanol groups, etc., contained in the other components of the primer composition. This component (d) is an important ingredient which enhances both the adhesion of a cured primer layer formed from the primer composition to the substrate and the adhesion between the cured primer layer and the coating composition of the invention, thereby imparting weatherability, water resistance, and other properties to the coating film. Such tin compounds which can be used as component (d) are not particularly limited. Examples thereof include tin carboxylates such as tin octylate; organotin carboxylates such as dibutyltin diacetate, dibutyltin dilaurate, dibutyltin dimaleate, and dibutyltin diphthalate; products of the de-esterification reactions of these compounds with alkoxysilanes such as tetramethoxysilane and tetraethoxysilane; organotin oxides such as dibutyltin oxide; products of the reactions of such organotin oxides with esters; and the like.

The amount of the above-described tin compound (d) added to the primer composition is generally from 0.01 to 30 parts by weight, preferably from 0.05 to 10 parts by weight, per 100 parts by weight of the prepolymer (a). If the amount of component (d) added is below 0.01 part by weight, there is a fear that the adhesion properties, particularly wet adhesion strength, of the resulting coating film deteriorate. If the amount thereof exceeds 30 parts by weight, the curing rate of the primer composition tends to be so high that the coating properties of the composition are adversely affected.

The primer composition comprising the above-described components is suitably diluted with an organic solvent for the purpose of making the coating operation for the composition easy or imparting good storage stability to the composition. Examples of the solvent include carboxylic acid esters such as ethyl acetate and butyl acetate; ketones such a acetone and methyl ethyl ketone; aromatic compounds such as toluene, xylene, and benzene; ethers such as diethyl ether, tetrahydrofuran, and dioxane; and heterocyclic compounds containing oxygen; and the like. These solvents can be used alone or in combination of two or more thereof.

The primer composition used in the present invention may further contain other additives including coloring pigments such as titanium oxide, carbon black iron oxide, etc. These additives can be used in such amounts not to weaken the effect of the present invention.

The primer composition, or components (a) to (d), is/are stored before use as follows. In general, a mixture of the isocyanate prepolymer (a), the organosilicon compound (b), and the epoxy resin-modified silicone resin (c) which is added according to need is stored separately from the tin compound (d) as a two-pack system, and the two packs are mixed just before use. It is, however, possible to mix all the components and store the mixture in a single vessel as a one-pack system.

The first step in the process according to the present invention, i.e., the step of applying the primer composition on an inorganic hardened product and curing the applied composition, is described below.

The surface of the inorganic hardened product to be used should, in principle, be free of dust and oil. Further, the moisture content of the substrate desirably is less than 80%, preferably less than 70%, of the saturated moisture content for the substrate. The presence of dust or oil on the substrate surface or too high moisture content of the substrate results in poor adhesion of the primer layer to the substrate.

Methods of applying the primer composition are not particularly limited, and spray coating, roll coating, flow coating, or other coating methods can be employed according to the propose of use of the product. The thickness of the primer layer applied is preferably from 0.5 to less than 50 μm. If the thickness, is below 0.5 μm, it is difficult to uniformly form such a thin primer layer. If the thickness is 50 μm or more, there is a fear of foaming. In the case where a primer layer having s of 50 μm or more is strongly desired, the primer composition is coated two or more times, each coating being followed by drying.

The primer composition applied is dried preferably at 5 to 150° C., more preferably at 10 to 100° C. If the drying temperature is below 5° C., curing proceeds too slowly. If the drying temperature exceeds 150° C., there is a fear of foaming. The treating time, although varying depending on the temperature and the amount applied, is generally from 3 minutes to 24 hours. In the case of practicing the process of the present invention in a factory or the like, the treating time preferably is from 3 to 60 minutes from the standpoint of production efficiency. For example, if drying is conducted by means of a hot-air drying machine with the temperature being 80° C. and the air flow being 4 m/sec in terms of perpendicular flow rate, the treatment can be completed in 10 to 20 minutes.

A pigment may be added to the primer composition, but it is preferred that the amount of the pigment added be less than 60 parts by weight per 100 parts by weight, on a dry basis, of the vehicle. If the amount thereof exceeds 60 parts by weight, the resulting primer layer shows poor adhesion or the silicon alkoxide-type coating film to be formed on the primer layer has poor resistance to cracking.

In the second step, the coating composition of the present invention is then applied on the primer layer. As the coating composition of the present invention, a clear coating composition may be directly applied, or a pigmented coating composition may be applied. Alternatively, a pigmented coating composition may be applied two or more times, and a clear coating composition may be or may not be applied thereon. A suitable constitution is selected according to the use of the product. For example, a substrate having a pattern of laid bricks or tiles is used, the depressed parts and the projected parts are coated so as to have different colors, and a clear coating is then formed thereon. A method for painting such depressed parts and projected parts in different colors is to first apply a coating composition over the whole surface by spraying and then apply a coating composition having a different color to the projected parts by roll coating. In order to decorate the whole surface with a speckled pattern, spraying or coating with a brush roll is employed.

Methods for coating the coating composition of the present invention are not particularly limited, and a suitable coating method is selected from the above-described coating methods and other coating methods according to the use of the product. The thickness of the coating film is generally from 0.1 to 100 μm, preferably from 1 to 80 μm, more preferably from 1 to 50 μm, and most preferably from 3 to 25 μm. If the thickness is less than the lower limit, there are cases where the film formed is not continuous. If the thickness is more than the upper limit, there is a fear of cracking and foaming. Drying of the coating composition applied is generally conducted at 5 to 200° C., preferably at 10 to 150° C. If the drying temperature is below 5° C., curing proceeds too slowly. If the drying temperature exceeds 200° C., there is a fear of cracking and foaming. The treating time, although varying depending on the temperature and the amount applied, is generally from 3 minutes to 24 hours. In the case of practicing the process of the present invention in a factory or the like, the treating time preferably is from 3 to 60 minutes from the standpoint of production efficiency. For example, if drying is conducted by means of a hot-air drying machine with the temperature being 80° C. and the air flow being 4 m/sec in terms of perpendicular flow rate, the treatment can be completed in 10 to 20 minutes.

In the case of conventional silicon alkoxide-based coating materials which cure by baking (which undergo dehydration condensation reactions), substrates which can be coated therewith have been limited in substrate pattern and in tongue shape, because coating the substrates having a projection-depression pattern or a tongue with those conventional coating materials may result in cracking of the substrates during the treatment. In the case where those conventional coating materials are applied to plastic substrates having insufficient heat resistance, the substrates suffer deformation by the treatment. These problems can be eliminated by using the coating composition of the present invention.

The coating composition of the present invention, comprising the above-described specific components (A), (B), and (C), can be cured quickly to give a cured film having a high hardness and excellent adhesion, solvent resistance (curability), resistance to boiling water, and weatherability. Further, since the coating composition of the present invention can cure at ordinary temperature or can be heat-cured, it can be used in a wide drying condition range (a wide range of environments) or in a wide temperature range. Therefore, the coating composition is applicable to substrates having poor heat resistance and is usable at construction sites where heating of the coated compositions is impossible. Hence, the coating composition of the present invention is of great industrial value.

The coating composition of the present invention can be arbitrarily colored by adding a pigment thereto, and the composition can give a cured film having excellent smoothness, adhesion, solvent resistance (curability), resistance to boiling water, and weatherability by regulating the average molecular weight of component (B) to a value in the range specified hereinabove.

The coated inorganic hardened product of the present invention, as described above, comprises an inorganic hardened product such as a cement-derived hardened product, having provided on the surface thereof, a cured layer formed from the coating composition of the present invention. This cured layer has a high hardness and excellent weatherability and is free of cracking or peeling over a prolonged period of time.

According to the process for producing a coated inorganic hardened product in accordance with the present invention, cured coating layers as described above can be formed even at construction sites, and even a substrate having insufficient heat resistance or a substrate having a tongue or a projection-depression pattern and having a small-thickness portion therein can also be covered with such a cured layer without the fear of cracking. From the above, it is apparent that the present invention has a high industrial value.

Due to the cured layer, a high-grade appearance can be imparted to the coated inorganic hardened product.

The present invention is explained below in more detail by reference to the following Examples and Comparative Examples, but the Examples should not be construed to be limiting the scope of the invention. In these examples, all parts and percents are by weight unless otherwise indicated.

Preparation examples for component (A) are first explained below.

PREPARATION EXAMPLE A-1

In a flask equipped with a stirrer, heating jacket, condenser, and thermometer were placed 100 parts of IPA-ST (an isopropanol-dispersed colloidal silica sol manufactured by 10–20 mμ, solid content 30%, $H_2O$ content 0.5%), 68 parts of methyltrimethoxysilane, and 10.8 parts of water. The resulting mixture was heated at 65° C. with stirring for about 5 hours to conduct partial hydrolysis reaction, and then cooled to obtain a component (A). The thus-obtained component (A), which is called A-1, had a solid content of 36% as measured after it was left at room temperature for 48 hours.

Preparation Conditions for A-1

Amount of water per mol of hydrolyzable group: $4 \times 10^{-1}$ mol
Silica content in component (A): 47.3%
Hydrolyzable organosilane where n=1: 100 mol %

PREPARATION EXAMPLE A-2

In a flask equipped with a stirrer, heating jacket, condenser, and thermometer were placed 100 parts of XBA-ST (a xylene-butanol-dispersed colloidal silica sol manufactured by Nissan Chemical Industries, Ltd.; particle diameter 10–20 mμ, solid content 30%, $H_2O$ content 0.2%), 68 parts of methyltrimethoxysilane, 49.5 parts of phenyltrimethoxysilane, 14.4 parts of water, and 0.1 part of acetic anhydride. The resulting mixture was heated at 80° C. with stirring for about 3 hours to conduct partial hydrolysis reaction, and then cooled to obtain a component (A). The thus-obtained component (A), which is called A-2, had a solid content of 41% as measured after it was left at room temperature for 48 hours.

Preparation Conditions for A-2

Amount of water per mol of hydrolyzable group: $4 \times 10^{-1}$ mol
Silica content in component (A): 31.3%
Hydrolyzable organosilane where n=1: 100 mol %

PREPARATION EXAMPLE A-3

In a flask equipped with a stirrer, heating jacket, condenser, and thermometer were placed 150 parts of NBA-ST (an n-butanol-dispersed colloidal silica sol manufactured by Nissan Chemical Industries, Ltd.; particle diameter 10-20 m$\mu$, solid content 20%, H$_2$O content 0.5%), 178 parts of methyltriethoxysilane, 21.4 parts of 3,3,3-trifluoropropyltrimethoxysilane, 12 parts of dimethyldimethoxysilane, 26 parts of water, and 0.2 part of acetic anhydride. The resulting mixture was heated at 80° C. with stirring for about 8 hours to conduct partial hydrolysis reaction, and then cooled to obtain a component (A). The thus-obtained component (A), which is called A-3, had a solid content of 31% as measured after it was left at room temperature for 48 hours.

Preparation Conditions for A-3

Amount of water per mol of hydrolyzable group: $4 \times 10^{-1}$ mol
Silica content in component (A): 25.2%
Hydrolyzable organosilane where n=1: 92 mol %

PREPARATION EXAMPLE A-4

In a flask equipped with a stirrer, heating jacket, condenser, and thermometer was placed 100 parts of methyltris(methyl ethyl ketoxime)silane. To the flask was then added with stirring a mixture of 100 parts of NBA-ST (an n-butanol-dispersed colloidal silica sol manufactured by Nissan Chemical Industries, Ltd.; particle diameter 10-20 m$\mu$, solid content 20%, H$_2$O content 0.5%) and 9 parts of water. The resulting mixture was stirred at room temperature for about 8 hours to conduct partial hydrolysis reaction, and then cooled to obtain a component (A). The thus-obtained component (A), which is called A-4, had a solid content of 31% as measured after it was left at room temperature for 48 hours.

Preparation Conditions for A-4:

Amount of water per mol of hydrolyzable group: $5 \times 10^{-1}$ mol
Silica content in component (A): 47.3%
Hydrolyzable organosilane where n=1: 100 mol %

PREPARATION EXAMPLE A-5

In a flask equipped with a stirrer, heating jacket, condenser, and thermometer were placed 100 parts of XBA-ST (a xylene-n-butanol-dispersed colloidal silica sol manufactured by Nissan Chemical Industries, Ltd.; particle diameter 10-20 m$\mu$, solid content 30%, H$_2$O content 0.2%) and 68 parts of methyltrimethoxysilane. The resulting mixture was heated at 65° C. with stirring for about 5 hours to conduct partial hydrolysis reaction, and then cooled to obtain a component (A). The thus-obtained component (A), which is called A-5, had a solid content of 36% as measured after it was left at room temperature for 48 hours.

Preparation Conditions for A-5

Amount of water per mol of hydrolyzable group: $7 \times 10^{-3}$ mol
Silica content in component (A): 47.2%
Hydrolyzable organosilane where n=1: 100 mol %

PREPARATION EXAMPLE A-6

In a flask equipped with a stirrer, heating jacket, condenser, and thermometer were placed 100 parts of IPA-ST (an isopropyl alcohol-dispersed colloidal silica sol manufactured by Nissan Chemical Industries, Ltd.; particle diameter 10-20 m$\mu$, solid content 30%, H$_2$O content 0.5%), 68 parts of methyltrimethoxysilane, 18 parts of dimethyldimethoxysilane, 2.7 parts of water, and 0.1 part of acetic anhydride. The resulting mixture was heated at 80° C. with stirring for about 3 hours to conduct partial hydrolysis reaction, and then cooled to obtain a component (A). The thus-obtained component (A), which is called A-6, had a solid content of 36% as measured after it was left at room temperature for 48 hours.

Preparation Conditions for A-6

Amount of water per mol of hydrolyzable group: $1 \times 10^{-1}$ mol
Silica content in component (A): 40.2%
Hydrolyzable organosilane where n=1: 77 mol %

PREPARATION EXAMPLE A-7

In a flask equipped with a stirrer, heating jacket, condenser, and thermometer were placed 100 parts of IPA-ST (an isopropanol-dispersed colloidal silica sol manufactured by Nissan Chemical Industries, Ltd.; particle diameter 10-20 m$\mu$, solid content 30%, H$_2$O content 0.5%), 68 parts of methyltrimethoxysilane, 49.5 parts of phenyltrimethoxysilane, and 7.7 parts of water. The resulting mixture was heated at 65° C. with stirring for about 5 hours to conduct partial hydrolysis reaction, and then cooled to obtain a component (A). The thus-obtained component (A), which is called A-7, had a solid content of 36% as measured after it was left at room temperature for 48 hours.

Preparation Conditions for A-7

Amount of water per mol of hydrolyzable group: $2 \times 10^{-1}$ mol
Silica content in component (A): 31.3%
Hydrolyzable organosilane where n=1: 100 mol %

PREPARATION EXAMPLE A-8

In a flask equipped with a stirrer, heating jacket, condenser, and thermometer were placed 100 parts of IPA-ST (an isopropyl alcohol-dispersed colloidal silica sol manufactured by Nissan Chemical Industries, Ltd.; particle diameter 10-20 m$\mu$, solid content 30%, H$_2$O content 0.5%), 68 parts of methyltrimethoxysilane, 5 parts of trimethylmethoxysilane, 2.3 parts of water, and 0.1 part of acetic anhydride. The resulting mixture was heated at 80° C. with stirring for about 3 hours to conduct partial hydrolysis reaction, and then cooled to obtain a component (A). The thus-obtained component (A), which is called A-8, had a solid content of 36% as measured after it was left at room temperature for 48 hours.

Preparation Conditions for A-8

Amount of water per mol of hydrolyzable group: $1 \times 10^{-1}$ mol

Silica content in component (A): 44.5%

Hydrolyzable organosilane where n=1: 91.2 mol %

In the above preparation examples, the term "at room temperature" means "in an atmosphere of 25±2° C. and 60±5% RH".

Preparation examples for component (B) are then explained below.

PREPARATION EXAMPLE B-1

In an flask equipped with a stirrer, heating jacket, condenser, dropping funnel, and thermometer was placed a mixture of 220 parts (1 mol) of methyltriisopropoxysilane and 150 parts of toluene. 108 Parts of 1% hydrochloric acid was then added dropwise to the above mixture over a period of 20 minutes, thereby to hydrolyze the methyltripropoxysilane. 40 Minutes after completion of the addition, stirring was stopped, upon which the reaction mixture was separated into two layers. The lower layer of a water-isopropyl alcohol mixture containing a small amount of hydrochloric acid was separated. The remaining resin solution in toluene was washed with water to remove the hydrochloric acid contained in the solution, and the toluene was then removed under reduced pressure. The residue was diluted with isopropyl alcohol to obtain a 40% isopropyl alcohol solution of a silanol group-containing organopolysiloxane having an average molecular weight of about 2,000. This solution is called B-1. The molecular weight was determined by means of GPC (Gel Permeation Chromatography) using chromatograph HLC-802UR (manufactured by Tosoh Corporation, Japan), based on calibration with standard polystyrene. Molecular weight measurements in the following examples were made likewise.

PREPARATION EXAMPLE B-2

In a flask equipped with a stirrer, heating jacket, condenser, dropping funnel, and thermometer were placed 1,000 parts of water and 50 parts of acetone. A solution obtained by dissolving 44.8 parts (0.3 mol) of methyltrichlorosilane, 38.7 parts (0.3 mol) of dimethyldichlorosilane, and 84.6 parts (0.4 mol) of phenyltrichlorosilane in 200 parts of toluene was then added dropwise with stirring to the above mixture in the flask, thereby to conduct hydrolysis. 40 Minutes after completion of the addition, stirring was stopped, and the reaction mixture was then transferred to a separatory funnel and allowed to stand. After the reaction mixture was separated into two layers, the lower aqueous layer containing hydrochloric acid was removed. The upper organic layer which was an organopolysiloxane solution in toluene was then subjected to vacuum stripping, whereby the water and hydrochloric acid remaining in the toluene solution were removed by evaporation along with an excess of toluene. Thus, a 60% toluene solution of a silanol group-containing organopolysiloxane having an average molecular weight of about 3,000 was obtained. This solution is called B-2.

PREPARATION EXAMPLE B-3

The same procedures as in Preparation Example B-2 were repeated except that 19.4 parts (0.15 mol) of the dimethyldichlorosilane was replaced with diphenyldichlorosilane and xylene was used in place of toluene. Thus, a xylene solution of a silanol group- containing organopolysiloxane was obtained. This solution was heated at 150° C. for 16 hours to conduct dehydration condensation reaction of the silanol group-containing organopolysiloxane, thereby obtaining a 50% xylene solution of a silanol group-containing organopolysiloxane having an average molecular weight of about 300,000. This solution is called B-3.

PREPARATION EXAMPLE B-4

The same procedures as in Preparation Example B-1 were repeated except that after the hydrolysis, the water and hydrochloric acid remaining in the upper layer, i.e., the toluene solution of an organopolysiloxane, were removed under reduced pressure along with an excess of toluene to give a toluene solution having a resin concentration of 80%, and this solution was diluted with isopropyl alcohol to a resin concentration of 60%. Thus, a 60% toluene-isopropyl alcohol solution of a silanol group-containing organopolysiloxane having an average molecular weight of about 3,000 was obtained. This solution is called B-4.

The following are examples of the coating composition in accordance with the present invention and comparative examples therefor in the case where the coating composition is of a clear type.

EXAMPLES 1 TO 9 AND COMPARATIVE EXAMPLES 1 AND 2

Coating compositions were obtained by blending the components as shown in Table 1 in respective proportions shown in Table 1. In Comparative Examples 1 and 2, IPA was used as a diluent solvent to make the coating compositions suitable for spray coating.

On test pieces having an aluminum coating formed by flame spraying (trade name, Alstar; manufactured by Nippon Test Panel, Japan), each of the coating compositions obtained in the Examples and Comparative Examples was applied by spray coating at a thickness of about 10 μm in terms of cured film thickness. The applied coating compositions were cured by heating at 140° C. for 30 minutes to form films (coating films), which were evaluated for various properties.

The tests for evaluating film properties were conducted according to the following methods.

Adhesion:

Adhesion to the substrate was measured by a crosscut tape test using cellophane tape.

Film hardness:

Pencil hardness test (in accordance with JIS K5400).

Solvent resistance:

Toluene-impregnated gauze was rubbed against the coating film 100 times in terms of the number of reciprocating movements of the gauze, while the gauze was being pressed lightly against the film, and then the state of the film was examined. Samples with no change were regarded as good in curability.

Boiling water resistance:

The test piece was boiled in tap water for 16 hours and then allowed to stand for 1 hour. The state of the coating film was then examined. Samples with no change were regarded as good in boiling water resistance.

Weatherability:

The test piece was irradiated with a sunshine weatherometer (in accordance with JIS K5400) for 2,500 hours, and the state of the coating film was examined. Samples with no change were regarded as good in weatherability.

The results of the above film property evaluations of the coating compositions of Examples 1 to 9 and Comparative Examples 1 and 2 are shown in Table 1 together with the formulations for these coating compositions.

comparative coating composition. Water was added just before applying the coating composition. This coating composition was applied on test pieces and film properties were evaluated in the same manner as in Example 1 except that IPA was used as a diluent solvent to make the coating composition suitable for spray coating.

The results obtained are shown in Table 1.

TABLE 1

| Formulation for coating composition | Examples | | | | | |
|---|---|---|---|---|---|---|
| (parts) | 1 | 2 | 3 | 4 | 5 | 6 |
| Component A | | | | | | |
| A-1 | 65 | — | — | — | — | — |
| A-2 | — | 80 | 50 | — | — | — |
| A-3 | — | — | — | 80 | — | — |
| A-4 | — | — | — | — | 70 | — |
| A-5 | — | — | — | — | — | 65 |
| A-6 | — | — | — | — | — | — |
| A-7 | — | — | — | — | — | — |
| A-8 | — | — | — | — | — | — |
| Component B | | | | | | |
| B-1 | 35 | — | — | 20 | 30 | 35 |
| B-2 | — | 20 | — | — | — | — |
| B-3 | — | — | 50 | — | — | — |
| B-4 | — | — | — | — | — | — |
| B-5 | — | — | — | — | — | — |
| Component C | | | | | | |
| N-$\beta$-Aminoethyl-$\gamma$-aminopropylmethyldimethoxysilane | 0.5 | — | — | — | 0.5 | 1 |
| N-$\beta$-Aminoethyl-$\gamma$-aminopropyltrimethoxysilane | — | 1 | 1 | 0.5 | — | — |
| Dibutyltin dilaurate | — | — | 0.1 | 0.2 | — | — |
| Film property | | | | | | |
| Crosscut tape test | 100/100 | 100/100 | 100/100 | 100/100 | 100/100 | 100/100 |
| Pencil hardness | 5H | 4H | 3H | 4H | 5H | 5H |
| Boiling water resistance | good | good | good | good | good | good |
| Solvent resistance | good | good | good | good | good | good |
| Weatherability | good | good | good | good | good | good |

| Formulation for coating composition | Examples | | | Comparative Examples | | |
|---|---|---|---|---|---|---|
| (parts) | 7 | 8 | 9 | 1 | 2 | 3 |
| Component A | | | | | | |
| A-1 | — | — | — | — | — | — |
| A-2 | — | — | — | — | — | — |
| A-3 | — | — | — | — | — | — |
| A-4 | — | — | — | — | — | — |
| A-5 | — | — | — | — | — | — |
| A-6 | 80 | — | — | — | — | 100 |
| A-7 | — | 60 | — | — | — | — |
| A-8 | — | — | 80 | — | — | — |
| Component B | | | | | | |
| B-1 | — | 40 | 20 | 100 | — | — |
| B-2 | 20 | — | — | — | — | — |
| B-3 | — | — | — | — | 100 | — |
| B-4 | — | — | — | — | — | — |
| B-5 | — | — | — | — | — | — |
| Component C | | | | | | |
| N-$\beta$-Aminoethyl-$\gamma$-aminopropylmethyldimethoxysilane | — | — | — | 0.5 | 0.5 | 0.5 |
| N-$\beta$-Aminoethyl-$\gamma$-aminopropyltrimethoxysilane | 1 | 1 | 1 | — | — | — |
| Dibutyltin dilaurate | 0.1 | — | — | — | — | — |
| Film property | | | | | | |
| Crosscut tape test | 100/100 | 100/100 | 100/100 | 10/100 | 90/100 | 80/100 |
| Pencil hardness | 4H | 4H | 4H | HB | B | H |
| Boiling water resistance | good | good | good | peeled | peeled | peeled |
| Solvent resistance | good | good | good | swelled | swelled | good |
| Weatherability | good | good | good | gloss disappeared | gloss disappeared | cracked |

COMPARATIVE EXAMPLE 3

100 Parts of A-6 was mixed with 0.5 part of N-$\beta$-aminoethyl-$\gamma$-aminopropylmethyldimethoxysilane. To this mixture was added 3 parts of water, to prepare a The results in Table 1 show that the coating compositions of the present invention are superior to the comparative coating compositions in all of adhesion, film hardness, solvent resistance (curability), boiling water resistance, and weatherability.

The following are examples of the coating composition of the present invention and comparative examples therefor in the case where the coating composition contains a pigment and/or other optional ingredients.

EXAMPLES 10 TO 14

According to the formulations shown in Table 2,

The ordinary temperature-curing and -drying properties of the coating films were evaluated by measuring the tack-free time and cure drying time in accordance with JIS K5400. Further, the test pieces were immersed in 60° C. warm water for a continuous 200-hour period, and the state of each resulting coating film was examined. Other film properties were evaluated in the same manner as in Example 1.

The results obtained are shown in Table 2.

TABLE 2

| Formulation for coating composition (parts) | Example | | | | | | | Comp. Ex. 4 |
|---|---|---|---|---|---|---|---|---|
| | 10 | 11 | 12 | 13 | 14 | 15 | 16 | |
| Component A | | | | | | | | |
| A-1 | 185 | — | — | — | — | — | — | 185 |
| A-2 | — | 400 | 100 | — | — | — | — | — |
| A-3 | — | — | — | 400 | — | 400 | 241 | — |
| A-4 | — | — | — | — | 233 | — | — | — |
| Component B | | | | | | | | |
| B-1 | 100 | — | — | 100 | 100 | 100 | 100 | 100 |
| B-2 | — | 100 | — | — | — | — | — | — |
| B-3 | — | — | 100 | — | — | — | — | — |
| Component C | | | | | | | | |
| N-β-Aminoethyl-γ-aminopropylmethyldimethoxysilane | 1.4 | — | — | — | 2 | — | — | — |
| N-β-Aminoethyl-γ-aminopropyltrimethoxysilane | — | 10 | 2 | 5 | — | 5 | 5 | — |
| Dibutyltin dilaurate | 0.2 | — | 0.5 | 2 | 0.2 | 2 | 2 | — |
| Pigment | | | | | | | | |
| TiO$_2$(R-820) | 70 | 150 | 62 | 150 | 58 | 120 | 70 | 70 |
| Film property | | | | | | | | |
| Tack-free time (min) | ≦5 | ≦7 | ≦7 | ≦5 | ≦5 | ≦5 | ≦5 | ≦10 |
| Cure dying time (hr) | ≦2 | ≦2 | ≦2 | ≦2 | ≦2 | ≦2 | ≦2 | ≦7 |
| Immersion in 60°C. warm water | good | good | good | good | good | dood | good | gloss disappeared |
| Pencil hardners | 5H | 4H | 3H | 4H | 5H | 4H | 3H | HB |
| Solvent resistance | good | good | good | good | good | good | good | film dissolved |
| Weatherability (sunshine weatherometer) | good | good | good | good | good | good | good | gloss disappeared | white pigment titanium oxide R-820 (manufactured by Ishihara Sangyo Co., Ltd., Japan) was mixed with each of the components (B), and the resulting mixtures were treated with a sand grinder to disperse the titanium oxide to prepare white fluids, and the resulting white fluids were then mixed with the components (A) and components (C) (catalyst) according to the formulations. Thus, coating compositions were obtained.

EXAMPLES 15 AND 16

According to the formulations shown in Table 2, mixtures o A-3 and white pigment titanium oxide R-820 (manufactured by Ishihara Sangyo Co., Ltd.) were treated with a sand grinder to disperse the titanium oxide, and the resulting white fluids were mixed with the components (C) and component (B), thereby obtaining coating compositions.

COMPARATIVE EXAMPLE 4

A coating composition was prepared in the same manner as in Example 10 except that curing catalyst was not used. Each of the coating compositions obtained in Examples 10 to 16 and Comparative Example 4 was applied by spray coating on a slate at a thickness of about 20 μm in terms of cured film thickness. The applied coating compositions were allowed to stand at room temperature for 1 week, thereby forming room temperature-dried cured films. Thus, test pieces were prepared. These coating films were evaluated for various properties as follows.

The results in Table 2 show that the films formed from the coating compositions of the Examples are superior to the film of the Comparative Example in all of curing and drying properties at ordinary temperature, film hardness, curability, and weatherability.

EXAMPLES 17 TO 20

According to the formulations shown in Table 3, coating compositions of Examples 17 to 20 were obtained. These coating compositions were applied by spray coating on substrates shown in Table 3, and then cured under the curing conditions shown in Table to form cured films at a thickness of about 10 μm. The thus-obtained test pieces were evaluated for film properties in the same manner as described above.

The results obtained are shown in Table 3, in which "Tinuvin P" is the trade name of a benzotriazole-type ultraviolet absorber manufactured by CIBA-GEIGY.

TABLE 3

| Formulation for coating composition (parts) | Examples | | | |
|---|---|---|---|---|
| | 17 | 18 | 19 | 20 |
| Component A | | | | |
| A-1 | 80 | — | — | — |
| A-2 | — | 80 | — | — |
| A-3 | — | — | 80 | — |
| A-4 | — | — | — | 65 |
| Component B | | | | |
| B-1 | 20 | — | — | 35 |

TABLE 3-continued

| Formulation for coating composition (parts) | Examples | | | |
|---|---|---|---|---|
| | 17 | 18 | 19 | 20 |
| B-2 | — | — | 20 | — |
| B-4 | — | 20 | — | — |
| Component C | | | | |
| N-β-Aminoethyl-γ-amino-propylmethyldimethoxysilane | — | 1.0 | — | — |
| N-β-Aminoethyl-γ-amino-propyltrimethoxysilane | 0.5 | — | 1.0 | 2.0 |
| Dibutyltin dilaurate | — | — | 0.1 | 0.2 |
| UV-ray absorber | | | | |
| 2,4-Dihydroxybenzophenone | 1.0 | 0.5 | — | — |
| Tinuvin P | — | 2.0 | — | — |
| Substrate | acrylic resin | polycarbonate | alumina porcelain plate | quartz glass |
| Curing conditions | 80° C., 60 min | 120° C. 40 min | 140° C., 20 min | 200° C., 10 min |
| Film property | | | | |
| Crosscut tape test | 100/100 | 100/100 | 100/100 | 100/100 |
| Pencil hardners | 4H | 4H | 6H | 6H |
| Immersion in warm water | 60° C., 24 hr; good | 80° C., 2 hr; good | 98° C., 8 hr; good | 98° C., 2 hr; good |
| Solvent resistance | good | good | good | good |
| Weatherability | good | good | good | good |

From Table 3, it is seen that the films formed from the coating compositions of the present invention show good adhesion, film hardness, curability, and weatherability.

The following are examples of the coating composition of the present invention and reference examples and comparative examples therefor in the case where the coating composition contains a pigment and coating films having high gloss are formed from the composition.

EXAMPLES 21 TO 28 AND REFERENCE EXAMPLES 1 TO 4

Preparation examples for component (A) are first explained below.

PREPARATION EXAMPLE GA-1

In a flask equipped with a stirrer, heating jacket, condenser, and thermometer were placed 100 parts of IPA-ST (an isopropanol-dispersed colloidal silica sol manufactured by
Nissan Chemical Industries, Ltd.; particle diameter 10–20 mμ, solid content 30%, $H_2O$ content 0.5%), 68 parts of methyltrimethoxysilane, and 5.4 parts of water. The resulting mixture was heated at 65° C. with stirring for about 5 hours to conduct partial hydrolysis reaction, and then cooled to obtain a component (A). The thus-obtained component (A), which is called GA-1, had a solid content of 36% as measured after it was left at room temperature for 48 hours.

Preparation Conditions for GA-1

Amount of water per mol of hydrolyzable group: $2 \times 10^{-1}$ mol
Silica content in component (A): 47.2%
Hydrolyzable organosilane where n=1: 100 mol %

PREPARATION EXAMPLE GA-2

In a flask equipped with a stirrer, heating jacket, condenser, and thermometer were placed 150 parts of ME-ST (a methanol-dispersed colloidal silica sol manufactured by Nissan Chemical Industries, Ltd.; particle diameter 10–20 mμ, solid content 30%, $H_2O$ content 0.5%), 136 parts of methyltrimethoxysilane, 36 parts of dimethyldimethoxysilane, 75 parts of IPA, and 19.4 parts of water. The resulting mixture was heated at 60° C. with stirring for about 6 hours to conduct partial hydrolysis reaction, and then cooled to obtain a component (A). The thus-obtained component (A), which is called GA-2, had a solid content of 32% as measured after it was left at room temperature for 48 hours.

Preparation Conditions for GA-2

Amount of water per mol of hydrolyzable group: $3 \times 10^{-1}$ mol
Silica content in component (A): 33.5%
Hydrolyzable organosilane where n=1: 76.9 mol %

PREPARATION EXAMPLE GA-3

In a flask equipped with a stirrer, heating jacket, condenser, and thermometer were placed 100 parts of IPA-ST (an isopropanol-dispersed colloidal silica sol manufactured by Nissan Chemical Industries, Ltd.; particle diameter 10–20 mμ, solid content 30%, $H_2O$ content 0 5%), 68 parts of methyltrimethoxysilane, 18 parts of dimethyldimethoxysilane, 2.7 parts of water, and 0.1 part of acetic anhydride. The resulting mixture was heated at 80° C. with stirring for about 3 hours to conduct partial hydrolysis reaction, and then cooled to obtain a component (A). The thus-obtained component (A), which is called GA- 3, had a solid content of 36% as measured after it was left at room temperature for 48 hours.

Preparation Conditions for GA-3

Amount of water per mol of hydrolyzable group: $1 \times 10^{-1}$ mol
Silica content in component (A): 40.2%
Hydrolyzable organosilane where n=1: 77 mol %

Preparation examples for component (B) are then explained below.

PREPARATION EXAMPLE GB-1

In a flask equipped with a stirrer, heating jacket, condenser, dropping funnel, and thermometer was placed a mixture of 220 parts (1 mol) of methyltriisopropoxysilane and 150 parts of toluene. 108 Parts of 1% hydrochloric acid was then added dropwise to the above mixture over a period of 20 minutes, thereby to hydrolyze the methyltriisopropoxysilane. 30 Minutes after completion of the addition, stirring was stopped, upon which the reaction mixture was separated into two layers. The lower layer of a water-isopropyl alcohol mixture containing a small amount of hydrochloric acid was separated. The remaining resin solution in toluene was washed with water to remove the hydrochloric acid contained in the solution, and the toluene was then removed under reduced pressure. The residue was diluted with isopropyl alcohol to obtain a 40% isopropyl alcohol solution of a silanol group-containing organopolysiloxane having an average molecular weight of about 1,000. This solution is called GB-1. The molecular weight was determined by means of GPC (Gel Permeation Chromatography) using chromatographs HLC802A and HLC8020 (both manufactured by Tosoh Corporation), based on calibration with standard polystyrene. Molecular weight measurements in the following examples were made likewise.

PREPARATION EXAMPLE GB-2

In a flask equipped with a stirrer, heating jacket, condenser, dropping funnel, and thermometer was placed a mixture of 220 parts (1 mol) of methyltriisopropoxysilane and 150 parts of toluene. 108 Parts of 1.5% hydrochloric acid was then added dropwise to the above mixture over a period of 20 minutes, thereby to hydrolyze the methyltriisopropoxysilane. 60 Minutes after completion of the addition, stirring was stopped, upon which the reaction mixture was separated into two layers. The lower layer of a water-isopropyl alcohol mixture containing a small amount of hydrochloric acid was separated. The remaining resin solution in toluene was washed with water to remove the hydrochloric acid contained in the solution, and the toluene was then removed under reduced pressure. The residue was diluted with isopropyl alcohol to obtain a 40% isopropyl alcohol solution of a silanol group-containing organopolysiloxane having an average molecular weight of about 3,000. This solution is called GB-2.

PREPARATION EXAMPLE GB-3

In a flask equipped with a stirrer, heating jacket, condenser, dropping funnel, and thermometer was placed a mixture of 220 parts (1 mol) of methyltriisopropoxysilane and 150 parts of toluene. 108 Parts of 2% hydrochloric acid was then added dropwise to the above mixture over a period of 20 minutes, thereby to hydrolyze the methyltriisopropoxysilane. 120 Minutes after completion of the addition, stirring was stopped, upon which the reaction mixture was separated into two layers. The lower layer of a water-isopropyl alcohol mixture containing a small amount of hydrochloric acid was separated. The remaining resin solution in toluene was washed with water to remove the hydrochloric acid contained in the solution, and the toluene was then removed under reduced pressure. The residue was diluted with isopropyl alcohol to obtain a 40% isopropyl alcohol solution of a silanol group-containing organopolysiloxane having an average molecular weight of about 7,000. This solution is called GB-3.

PREPARATION EXAMPLE GB-4

In a flask equipped with a stirrer, heating jacket, condenser, dropping funnel, and thermometer were placed 1,000 parts of water and 50 parts of acetone. A solution obtained by dissolving 44.9 parts (0.3 mol) of methyltrichlorosilane, 38.7 parts (0.3 mol) of dimethyldichlorosilane, and 84.6 parts (0.4 mol) of phenyltrichlorosilane in 200 parts of toluene was then added dropwise with stirring to the above mixture in the flask, thereby to conduct hydrolysis. 40 Minutes after completion of the addition, stirring was stopped, and then the reaction mixture was transferred to a separatory funnel and allowed to stand. After the reaction mixture was separated into two layers, the lower aqueous layer containing hydrochloric acid was removed. The upper organic layer which was an organopolysiloxane solution in toluene was then subjected to vacuum stripping, whereby the water and hydrochloric acid remaining in the toluene solution were removed by evaporation along with an excess of toluene. Thus, a 60% toluene solution of a silanol group-containing organopolysiloxane having an average molecular weight of about 3,000 was obtained. This solution is called GB-4.

PREPARATION EXAMPLE GB-5

In a flask equipped with a stirrer, heating jacket, condenser, dropping funnel, and thermometer was placed a mixture of 220 parts (1 mol) of methyltriisopropoxysilane and 150 parts of toluene. 108 Parts of 0.2% hydrochloric acid was then added dropwise to the above mixture over a period of 20 minutes, thereby to hydrolyze the methyltriisopropoxysilane. 30 Minutes after completion of the addition, stirring was stopped, upon which the reaction mixture was separated into two layers. The lower layer of a water-isopropyl alcohol mixture containing a small amount of hydrochloric acid was separated. The remaining resin solution in toluene was washed with water to remove the hydrochloric acid contained in the solution, and the toluene was then removed under reduced pressure. The residue was diluted with isopropyl alcohol to obtain a 40% isopropyl alcohol solution of a silanol group-containing organopolysiloxane having an average molecular weight of about 500. This solution is called GB-5.

PREPARATION EXAMPLE GB-6

In a flask equipped with a stirrer, heating jacket, condenser, dropping funnel, and thermometer was placed a mixture of 220 parts (1 mol) of methyltriisopropoxysilane and 150 parts of toluene. 108 Parts of 5% hydrochloric acid was then added dropwise to the above mixture over a period of 20 minutes, thereby to hydrolyze the methyltriisopropoxysilane. 150 Minutes after completion of the addition, stirring was stopped, upon which the reaction mixture was separated into two layers. The lower layer of a water-isopropyl alcohol mixture containing a small amount of hydrochloric acid was separated. The remaining resin solution in toluene was washed with water to remove the hydrochloric acid contained in the solution, and the toluene was the removed under reduced pressure. The residue was diluted with isopropyl alcohol to obtain a 40% isopropyl alcohol solution of a silanol group-containing organopolysiloxane having an average molecular weight of about 13,000. This solution is called GB-6.

PREPARATION EXAMPLE GB-7

In a flask equipped with a stirrer, heating jacket, condenser, dropping funnel, and thermometer were placed 1,000 parts of water and 50 parts of acetone. A solution obtained by dissolving 44.8 parts (0.3 mol) of methyltrichlorosilane, 19.4 parts (0.15 mol) of dimethyldichlorosilane, 38.0 parts (0.15 mol) of diphenyldichlorosilane, and 84.6 parts (0.4 mol) of phenyltrichlorosilane in 200 parts of toluene was then added dropwise with stirring to the above mixture in the flask, thereby to conduct hydrolysis. 40 Minutes after completion of the addition, stirring was stopped, and the reaction mixture was then transferred to a separatory funnel and allowed to stand. After the reaction mixture was separated into two layers, the lower aqueous layer containing hydrochloric acid was removed. The upper organic layer which was an organopolysiloxane solution in toluene was then subjected to vacuum stripping, whereby the water and hydrochloric acid remaining in the toluene solution were removed by evaporation along with an excess of toluene. Thus, a xylene solution of a silanol group-containing organopolysiloxane was obtained. This solution was heated at 150° C. for 8 hours to conduct dehydration condensation reaction to obtain a 50% xylene solution of a silanol group-containing organopolysiloxane having an average molecular weight of about 100,000. This solution is called GB-7.

Pigment Dispersion

In Examples 21 to 27 and Reference Examples 1 and 2, pigment dispersion was conducted as follows. A mixture (pigment) of 99 parts of white pigment titanium oxide R-820 (manufactured by Ishihara Sangyo Co., Ltd.), 1 part of red iron oxide (manufactured by Toda Kogyo Corporation, Japan), and 0.1 part of carbon black (HCC) was dispersed in each of the above-obtained solutions GA-1 to GA-3 (liquids A) in various proportions as shown in Tables 4 and 5 by means of a grain mill. After each of the resulting liquids was allowed to stand for 24 hours at room temperature, 5 parts of N-β-aminoethyl-γ-aminopropyltrimethoxysilane and 1 part of dibutyltin dilaurate were added thereto as catalysts per 100 parts by weight of the liquid A. Thus, liquids A' containing pigments dispersed therein were prepared.

In Example 28 and Reference Examples 3 and 4, pigment dispersion was conducted under the same conditions as above except that dispersion of the same pigment in solution GA-1 was effected by means of a sand mill for 60 minutes (Example 28 and Reference Example 4) or 20 minutes (Reference Example 3).

Thereafter, liquids A' were combined with liquids B in amounts such that the proportion of liquids A to solutions B was 50 parts to 50 parts, thereby to prepare coating compositions for Examples 21 to 28 and Reference Examples 1 to 4 as shown in Tables 4 and 5. Before the use of each composition, the liquid A' and solution B were mixed.

On test pieces having an aluminum coating formed by flame spraying (trade name, Alstar; manufactured by Nippon Test Panel), each of the above-obtained coating compositions was applied by spray coating at a thickness of about 10 μm in terms of cured film thickness. The applied coating compositions were cured by heating at 100° C. for 20 minutes, and the resulting coating films were evaluated for various properties as follows.

Adhesion to the substrate was evaluated by a crosscut tape test using cellophane tape. Film hardness was measured by a pencil hardness test in accordance with JIS K5400. Gloss (60° gloss) was measured with a gloss meter. Curability was evaluated in terms of resistance to toluene (solvent resistance) and resistance to boiling water (boiling resistance; boiling in tap water for 1 hour).

Weatherability was evaluated in terms of gloss retention after a dew cycle test (500 hours).

The above evaluation tests were conducted after the test pieces obtained above were aged for 1 week at ordinary temperature.

In the solvent resistance test, toluene-impregnated gauze was rubbed against the coating film 100 times in terms of the number of reciprocating movements of the gauze, while the gauze was pressed lightly against the film, and the state of the film was examined. Samples with no change were regarded as good in solvent resistance.

In the boiling resistance test, the test piece was immersed in boiling tap water for 1 hour and then allowed to stand for 1 hour, and the state of the coating film was then examined. Samples with no change were regarded as good in boiling resistance.

The results obtained are shown in Tables 4 and 5.

COMPARATIVE EXAMPLE 5

10 Parts of tetraethoxysilane, 100 parts of methyltrimethoxysilane, 35 parts of dimethyldimethoxysilane, 80 parts of IPA silica sol (manufactured by Catalysts & Chemicals Industries Co., Ltd., Japan; $H_2O$ content 0.5%, solid content 30%), 50 parts of isopropanol, 0.4 part of 1N hydrochloric acid, and 6 parts of water were mixed, and the mixture was agitated at 500 rpm for 30 minutes in an atmosphere of 25° C. This liquid was stored for 3 days at ordinary temperature. To the resulting liquid were added 50 parts of titanium oxide (manufactured by Ishihara Sangyo Kaisha, Ltd.) and 1.0 part of Aerosil (silicon dioxide manufactured by Nippon Aerosil Co., Ltd., Japan) per 100 parts of the solid in the liquid. The resulting mixture was treated with a sand mill at 1,000 rpm for 20 minutes. The thus-obtained composition is called liquid C-A. Before use, 30 parts of water, 30 parts of IPA, and 0.2 part of 1N hydrochloric acid were added to 100 parts of the liquid C-A to obtain a coating composition, which is called liquid C-1.

Preparation Conditions for Liquid C-1

Amount of water per mol of hydrolyzable group
  before use $1 \times 10^{-1}$ mol
  during use $2 \times 10^1$ mol
Solid colloidal silica content in component (A): 24.4%
Hydrolyzable organosilane where n=1: 68.5 mol %

This liquid C-1 was evaluated in the same manner as in Examples 21 to 28 above, and the results obtained are shown in Table 6.

TABLE 4

| | Liquid A' | | | Film property | | | | | |
|---|---|---|---|---|---|---|---|---|---|
| | Kind | Pigment amount (parts) *1 | Kind of Solution B | Weatherability (gloss retention) (%) | Crosscut tape test | Pencil hardness | Glossness (%) | Solvent resistance | Boiling water resistance |
| Ex. 21 | GA-1 | 20 | GB-2 (Mw = 3000) | 91 | 100/100 | 4H | 65 | good | good |
| Ex. 22 | GA-1 | 50 | GB-2 (Mw = 3000) | 93 | 100/100 | 4H | 62 | good | good |
| Ex. 23 | GA-1 | 80 | GB-2 (Mw = 3000) | 90 | 100/100 | 5H | 50 | good | good |
| Ex. 24 | GA-1 | 50 | GB-3 (Mw = 7000) | 92 | 100/100 | 4H | 56 | good | good |
| Ex. 25 | GA-2 | 50 | GB-1 (Mw = 1000) | 93 | 100/100 | 3H | 70 | good | good |
| Ex. 26 | GA-2 | 50 | GB-4 (Mw = 3000) | 92 | 100/100 | 4H | 60 | good | good |
| Ex. 27 | GA-3 | 50 | GB-2 (Mw = 3000) | 91 | 100/100 | 4H | 65 | good | good |

Reference

TABLE 4-continued

| | Liquid A' | | | Film property | | | | | |
|---|---|---|---|---|---|---|---|---|---|
| | Kind | Pigment amount (parts) *1 | Kind of Solution B | Weather-ability (gloss re-tention) (%) | Crosscut tape test | Pencil hard-ness | Gloss-ness (%) | Solvent resistance | Boiling water resistance |
| Ex. 1 | GA-1 | 50 | GB-5 (Mw = 500) | 80*2 | 80/100 | H | 70 | good | peeled |
| Ex. 2 | GA-1 | 50 | GB-6 (Mw = 13000) | 90 | 100/100 | 4H | 4 | good | good |

(Note)
*1 Pigment amount is given in terms of parts per 100 parts, on a dry basis, of components (A) + (B).
*2 Affected by cracking.

TABLE 5

| | Liquid A' | | | | Film property | | | | | |
|---|---|---|---|---|---|---|---|---|---|---|
| | Kind | Pigment amount (parts) *1 | Pigment disper-sion | Kind of Solution B | Weather-ability (gloss re-tention) (%) | Crosscut tape test | Pencil hard-ness | Gloss-ness (%) | Solvent resistance | Boiling water resistance |
| Ex. 28 | GA-1 | 40 | sand mill 60 min | GB-6 (Mw = 13000) | 90 | 100/100 | 4H | 50 | good | good |
| Reference | | | | | | | | | | |
| Ex. 3 | GA-1 | 50 | sand mill 20 min. | GB-6 (Mw = 13000) | 90 | 100/100 | 4H | 4 | good | good |
| Ex. 4 | GA-1 | 40 | sand mill 60 min | GB-7 (Mw = 100000) | 90 | 100/100 | 4H | 4 | good | good |

(Note)
*1 Pigment amount is given in terms of parts per 100 parts, on a dry basis, of componentms (A) + (B).

TABLE 6

| | Kind of coating material | Pigment amount (parts)*1 | Film property | | | | | |
|---|---|---|---|---|---|---|---|---|
| | | | Weatherability | Crosscut tape test | Pencil hardness | Glossness (%) | Solvent resistance | Boiling water resistance |
| Comp. Ex. 5 | C-1 | 50 | film peeled*2 | 0/100 | 2B | 50 | good | good |

(Note)
*1 Pigment amount is given in terms of parts per 100 parts, on a dry basis, of components (A) + (B).
*2 Due to insufficient cure.

As shown in Tables 4 and 5, the coating compositions of the Examples give coating films having excellent weatherability and adhesion, high hardness, and good gloss, as well as good solvent resistance and boiling water resistance. To the contrary, the coating composition of Reference Example 1 give films which are poor in weatherability, adhesion, hardness, and boiling water resistance. The coating compositions of Reference Examples 2 to 4 give coating films with poor glossiness (the other performances thereof are equal to those of the films for Examples 21 to 28). The coating composition of Comparative Example 5, which is a coating material of the baking-cure type because it does not contain component (B) and has been added with water, hydrochloric acid, etc., in place of component (B), gives coating films having poor weatherability, adhesion, and hardness.

EXAMPLE 29

To 700 parts of the above-obtained solution GA-2 was added 17.2 parts of coloring carbon black (HCC). This mixture was treated with a grain mill to disperse the carbon black. To the resulting black fluid were added 6 parts of N-β-aminoethyl-γ-aminopropyltrimethoxysilane and 1.2 parts of dibutyltin dilaurate. Thus, liquid A' was prepared. 356.8 Parts of this liquid A' was then mixed with 150 parts of the above-prepared solution GB-1 to obtain a coating composition.

The above-obtained coating composition was applied on cement-derived substrates (hard slates having a bulk density of 1.7 g/cm$^3$ and a dimensional change from the water-saturated state to the absolute dry state of 0.1 to 0.15%; manufactured by Ask Corporation, Japan) by spray coating at a thickness of about 20 μm in terms of cured film thickness. The applied coating composition was cured at room temperature for 1 week, and the resulting coating film was evaluated for properties according to the methods described hereinabove.

The results obtained are shown in Table 7.

COMPARATIVE EXAMPLE 6

In a flask were placed 150 parts of Snowtex 0 (a water-dispersed silica sol manufactured by Nissan Chemical Industries, Ltd.; particle diameter 10-20 mμ, solid (SiO$_2$) content 20%) and 136 parts of methyltrimethoxysilane. The resulting mixture was heated at 65° C. with stirring for about 5 hours to conduct hydrolysis, thereby obtaining a solution of a silanol formed by partial condensation of the methyltrimethoxysilane. This silanol solution was diluted with isopropyl alcohol to a solid content of 20%. 5 Parts of coloring carbon black (HCC) was mixed with 500 parts of the diluted solution, and the resulting mixture was treated with a grain mill to disperse the carbon black to prepare a black fluid. To the fluid were then added 3 parts of N-β-aminoethyl-γ-amylpropyltrimethoxysilane and 0.6 part of dibutyltin dilaurate, thereby obtaining a comparative coating material.

Amount of water per mol of hydrolyzable group: 2.2 mol

Solid colloidal silica content in component (A): 30.9%

Hydrolyzable organosilane where n=1: 100 mol %

This comparative coating material was subjected to the same film property evaluation tests as in Example 29. The results obtained are shown in Table 7.

TABLE 7

| | Film property | | | | |
|---|---|---|---|---|---|
| | Weatherability (gloss retention) (%) | Crosscut tape test | Pencil hardness | Glossness (%) | Solvent resistance | Boiling water resistance |
| Example 29 | 90 | 100/100 | 4H | 70 | good | good |
| Comparative Example 6 | 30 | 90/100 | B | 50 | dissolved | blister |

Through room temperature curing, the coating composition of Example 29 gave coating films having excellent weatherability and adhesion, high hardness, and good gloss, solvent resistance, and boiling water resistance. To the contrary, the coating material of Comparative Example 6, which is of the baking-cure type because it does not contain component (B), gave coating films having poor weatherability, adhesion, and hardness.

The liquids A' obtained in Examples 21 to 29 and the coating material obtained in Comparative Example 6 were respectively placed in sealed vessels and subjected to a 50° C. accelerated test for evaluating stability. As a result, the coating material of Comparative Example 6 gelled in one day, whereas the liquids A' of Examples 21 to 29 suffered only slight viscosity increase even after 7 days.

The following are examples of the coating composition of the present invention and reference examples therefor in the case where the coating composition has good storage stability.

PREPARATION EXAMPLE A-9

The components (A) shown in Table 8 were stored in sealed polyethylene vessels for 48 hours, and the pH's of the components (A) were then adjusted to various values by adding thereto dropwise ethylenediamine (anhydrous) diluted with IPA to 10%, while monitoring the pH change. The thus-obtained components (A) with various pH values are called A-9.

Further, the same components (A) treated likewise were stored for 3 months in sealed polyethylene vessels.

EXAMPLES 30 TO 34 AND REFERENCE EXAMPLES 5 AND 6

60 Parts of each of the liquids A-9 having various pH values as shown in Table 8 was mixed with 40 parts of B-1 and 0.5 part of N-β-aminoethyl-γ-aminopropylmethyldimethoxysilane as a curing catalyst, thereby obtaining coating compositions of the present invention. Using these coating compositions just after the preparation thereof, test pieces were prepared and a film hardness test was conducted in the same manner as in Example 1. Likewise, coating compositions were obtained from the 3 month-stored liquids A-9, and test pieces were prepared using these coating compositions and subjected to a film hardness test.

The results of the film hardness evaluation are shown in Table 8.

EXAMPLE 35

The component (A) obtained in Preparation Example A-6 was stored in a sealed polyethylene vessel for 48 hours, and then the pH of the component (A) was then adjusted to 5.2 by adding thereto dropwise ethylenediamine (anhydrous) diluted with IPA to 10%, while monitoring the pH change. This liquid is called A-10. 60 Parts of this A-10 was mixed with 0.5 part of N-β-aminoethyl-γ-aminopropylmethyldimethoxysilane as component (C) to give C-2. This C-2 was mixed with 40 parts of B-1 to prepare a coating composition. Just after the preparation, this coating composition was used to prepare test pieces and a film hardness test was conducted in the same manner as in Example 1. Further, C-2 was stored for 3 months, and test pieces were prepared using the resulting C-2 and a film hardness test was conducted likewise.

The results obtained are shown in Table 9.

REFERENCE EXAMPLE 7

Test pieces were prepared and a film hardness test was conducted in the same manner as in Example 35 except that the pH was adjusted to 1.6. The results obtained are shown in Table 9.

TABLE 8

| | Preparation Example A-9 | | Film hardness | | Storage stability* |
|---|---|---|---|---|---|
| | Component (A) | pH | just after preparation | after 3 months | |
| Example | | | | | |
| 30 | A-7 | 3.9 | 4H | 4H | ○ |
| 31 | " | 4.5 | " | " | ○ |
| 32 | " | 6.5 | " | " | ○ |
| 33 | A-1 | 5.0 | 5H | 5H | ○ |
| 34 | A-6 | 3.0 | 4H | 4H | ○ |
| Reference Example | | | | | |
| 5 | A-1 | 1.8 | 4H | H | X |
| 6 | A-1 | 7.5 | 4H | B | X |

TABLE 9

| | Preparation Example A-10 | | Film hardness | | Storage stability* |
|---|---|---|---|---|---|
| | Component (A) | pH | just after preparation | after 3 months | |
| Example 35 | A-6 | 5.2 | 4H | 4H | ○ |
| Reference Example 7 | A-6 | 1.6 | 4H | 2H | X |

*Samples with no difference in film hardness between "just after preparation" and "after 3 months" were regarded as good (○) in storage stability, while samples with a difference were regarded as poor (X).

From tables 8 and 9, it is seen that by adjusting the pH of component (A) to 2 to 7, good storage stability was obtained.

Thus, the coating composition of the present invention can be made to have good storage stability and show stable performances over a prolonged period of time by adjusting the pH of component (A) to a value in the range of from 2 to 7.

The following are examples of the coated inorganic hardened product and process for producing the product according to the present invention and comparative examples therefor.

EXAMPLES 36 TO 41 AND COMPARATIVE EXAMPLE 7

Preparation of Primer (i) Preparation of Epoxy Resin-modified Silicone Resin Solution Solution S-1

7 Parts of dimethyldichlorosilane, 40 parts of methyltrichlorosilane, 48 parts of diphenyldichlorosilane, and 78 parts of phenyltrichlorosilane were mixed with 95 parts of toluene. This mixture was added dropwise to a liquid mixture of 350 parts of water and 50 parts of methanol, which was placed in a vessel equipped with a reflux condenser, while the water-methanol mixture was kept at 50° C. with stirring. Thus, hydrolysis and condensation were conducted.

The reaction mixture containing polmethylphenylsiloxane produced was washed with water to remove the hydrogen chloride formed as a by-product. The resulting reaction mixture was heated under reduced pressure to remove the water remaining as part of the solvent, thereby to obtain a 50% toluene solution of a silicone resin.

A solution was prepared by mixing 70 parts of a bisphenol A-epichlorohydrin epoxy resin having an epoxy equivalent of 250, 5 parts of phthalic anhydride, 10 parts of linseed oil fatty acid, and 75 parts of toluene. The solution was gradually heated with stirring to 230° C., while the toluene was being removed, and heating was further continued at the same temperature for 5 hours. Thereto was then added 50 parts of the above-obtained silicone resin toluene solution, and toluene was also added thereto in an amount that such a final solid content became 50%. The resulting mixture was stirred until it became transparent, thereby obtaining an epoxy resin-modified silicone resin toluene solution, S-1.

Solution S-2

51 Parts of dimethyldichlorosilane, 15 parts of methyltrichlorosilane, 44 parts of diphenyldichlorosilane, and 52 parts of phenyltrichlorosilane were mixed with 50 parts of xylene. This mixture was added dropwise to 320 parts of water, while the water was kept at 40 to 60° C. with stirring. The reaction mixture was then treated in the same manner as in solution S-1 above to obtain a 60% xylene solution of a silicone resin.

54 Parts of bisphenol A-epichlorohydrin epoxy resin having an epoxy equivalent of 500 and 25 parts of dodecylsuccinic anhydride were dissolved in 23 parts of xylene. To this solution was added 51 parts of the above-obtained silicone resin xylene solution, and the resulting mixture was heated for 3 hours with stirring at the reflux temperature of the solvent, thereby reacting the epoxy resin with the silicone resin. Xylene was then added to the reaction mixture in amount such that a final solid content became 50%. Thus, a 50% xylene solution of an epoxy resin-modified silicone resin, S-2, was obtained.

Solution S-3

49 Parts of dimethyldichlorosilane, 84 parts of phenyltrichlorosilane, and 103 parts of diphenyldichlorosilane were mixed. While the temperature of this mixture was kept at 25° C. or lower, a liquid mixture of 40 parts of methanol and 15 parts of water was gradually added dropwise thereto over a period of 2 hours. The reaction mixture was heated with stirring to 70 to 75° C., refluxed for 1 hour at that temperature, and then cooled. 40 Parts of methanol was added to the cooled reaction mixture, and the polyorganosiloxane layer was separated.

To this polyorganosiloxane layer was added 2 parts of calcium carbonate, thereby to neutralize the hydrogen chloride formed as a by-product. The resulting polyorganosiloxane layer was heated under reduced pressure to remove the methanol and low-boiling-point compounds, thereby obtaining a liquid polyorganosiloxane.

To 50 parts of this polyorganosiloxane were added 100 parts of xylene, 45 parts of a novolac epoxy resin having an epoxy equivalent of 180, and 3.5 parts of phthalic anhydride. The resulting mixture was heated for 3 hours under reflux of the xylene, cooled, and then filtered, thereby obtaining a 50% xylene solution of an epoxy resin-modified silicone resin, S-3.

(ii) Preparation of Primer Composition

According to the formulations shown in Table 10, primer compositions P-1 to P-5 were prepared by adding the epoxy resin-modified silicone resin, mercapto group-containing silicon compound, organotin compound, and solvent to (I-1) a 75% butyl acetate solution of an isocyanate prepolymer mixture whose main ingredient was represented by chemical formula (3) given hereinabove, (I-2) a 75% butyl acetate solution of an isocyanate prepolymer mixture whose main ingredient was represented by chemical formula (1) given hereinabove, (I-3) a 50% ethyl acetate solution of an isocyanate prepolymer mixture whose main ingredient was represented by chemical formula (5) given hereinabove, or combinations thereof.

Preparation of Coating Composition

A-5 and A-6 described above was used as component (A).

As component (B), the above-described B-1, B-2, and GB-1 were used along with B-6 described below.

PREPARATION EXAMPLE B-6

A 40% isopropyl alcohol solution of a silanol group-containing organopolysiloxane having an average molecular weight of about 3,000 was obtained in the same manner as in for the above-described GB-1 except that 1.5% hydrochloric acid was used in place of 1% hydrochloric acid and stirring was stopped 40 minutes after completion of the acid addition. The thus-obtained solution is called B-6.

Addition of Pigment

Mixtures of the component (A) shown in Table 11 and white pigment titanium oxide R-820 (manufactured by Ishihara Sangyo Kaisha, Ltd.) were treated with a sand grinder to disperse the titanium oxide, thereby preparing white fluids. Thereto were added the components (C) shown in Table 11 and then the components (B) shown in Table 11, thereby obtaining coating compositions.

PREPARATION EXAMPLE FOR COATING FLUID C-3

100 Parts of methyltrimethoxysilane, 20 parts of tetraethoxysilane, 105 parts of IPA silica sol OSCAL1432 (manufactured by Catalysts & Chemicals Industries Co., Ltd.; $SiO_2$ content 30%), 5 parts of dimethyldimethoxysilane, and 100 parts of IPA were mixed. To this liquid mixture were added 1 part of 1N hydrochloric acid as a catalyst and 4.5 parts of water, thereby giving liquid A. The above mixing was conducted by stirring the mixture at 25° C., 500 rpm for 30 minutes.

The thus-prepared liquid A was stored at 25° C. in a sealed vessel for 1 week or more. Before use, 42 parts of water and 42 parts of IPA were added to 100 parts of the liquid A, and the resulting mixture was stirred at 25° C., 500 rpm for 10 minutes to obtain a coating fluid, C-3.

PREPARATION CONDITIONS FOR C-3

Amount of water per mol of hydrolyzable group:
before use 0.1 mol
during use 3.3 mol
Solid colloidal silica content in component (A): 35.1%
Hydrolyzable organosilane where n=1: 84.2 mol %

As an inorganic hardened product, "Multi-siding" (an acrylic emulsion-sealed, cement-derived board having a bulk density of 1.0 g/cm$^3$ and a dimensional change from the water-saturated state to the absolute dry state of 0.3%; manufactured by Matsushita Electric Works Ltd., Japan) was used. This inorganic hardened board had been shaped as shown in FIGS. 1 to 3. The board has, on the front side thereof, grooves extending in the direction of the length of the board (in the vertical direction in FIG. 1) and grooves formed in the width direction (in the transverse direction in FIG. 1), thus having a projection-depression pattern. Further, a tongue or a groove has been formed on both side edges of the board (on the right and left edges of the board show in FIGS. 1 and 2), so that such boards are joined together in the width direction by means of such a tongue and groove. The actual lengths of the parts shown by symbols in FIGS. 2 and 3 are; a=465 mm, b=15 mm, c=5 mm, d=7 mm, e=7 mm, f=3 mm, g=5 mm, h=3 mm, i=2 mm, and j=3 mm. In FIG. 2, the projected part 32 in a penthouse form at the right end portion of the inorganic hardened board 1 has been provided with a groove 22 and, hence, includes a part having the smallest thickness (shown by j in the figure).

The primer compositions and coating compositions used are shown in Tables 10 and 11. The primer compositions each was applied on the "Multi-siding" by air spraying at a film thickness of 10 μm and then allowed to stand at room temperature (25±2° C., 60±5% RH) for 30 minutes, thereby forming primer layers.

The coating compositions each was applied on the primer layer by air spraying at a thickness of 10 μm in the case of intercoating or at a thickness of 8 μm in the case of topcoating, and then allowed to stand for 1 week at room temperature (25±2° C., 60±5% RH) to form cured coating films, which were evaluated for various properties.

The tests for evaluating film properties were conducted according to the following methods.

Adhesion: Adhesion to the substrate was measured by a crosscut tape test using cellophane tape.

Warm water resistance: A cycle consisting of immersing the test sample in 60° C. warm water for 8 hours and then air-drying the same for 16 hours at room temperature (25±2° C., 60±5% RH) was repeated 10 times, and the state of the coating film was examined.

Weatherability: The test piece was irradiated for 2,500 hours in a sunshine weatherometer (in accordance with JIS K5400), and the state of the coating film was examined. Samples with no change were regarded as good in weatherability.

The results obtained are shown in Table 12.

TABLE 10

| Formulation for primer composition (Parts) | | Primer composition | | | | |
|---|---|---|---|---|---|---|
| | | P-1 | P-2 | P-3 | P-4 | P-5 |
| Isocyanate prepolymer [Component (a)] | I-1 | 100 | — | — | 50 | 50 |
| | I-2 | — | 100 | — | 50 | 50 |
| | I-3 | — | — | 100 | — | — |
| Epoxy resin-modified silicone resin [Component (c)] | S-1 | 20 | 20 | 15 | — | — |
| | S-2 | — | — | — | 20 | — |
| | S-3 | — | — | — | — | 20 |
| Mercapto group-containing organosilicon compound [Component (b)] | γ-Mercaptopropyl-trimethoxysilane | 12 | 12 | 10 | — | — |
| | γ-Mercaptopropyl-triethoxysilane | — | — | — | 15 | 15 |
| Organotin compound [Compound (d)] | Dibutyltin dilaurate | 0.5 | 0.5 | 0.5 | — | — |
| | Dibutyltin oxide | — | — | — | 0.5 | 0.5 |
| Solvent | Ethyl acetate | 30 | 30 | 30 | 30 | 30 |

TABLE 11

| Formulation for coating composition (parts) | | Coating Composition | | | | | | |
|---|---|---|---|---|---|---|---|---|
| | | M-1 | M-2 | M-3 | M-4 | M-5 | M-6 | M-7 |
| Component A | A-5 | 65 | — | — | — | — | — | — |
| | A-6 | — | 80 | 50 | 100 | 100 | 100 | 100 |
| Component B | B-1 Mw = 2000 | 35 | — | — | — | — | — | — |
| | B-2 Mw = 3000 | — | 20 | 50 | — | — | — | — |
| | GB-1 Mw = 1000 | — | — | — | 100 | — | — | — |
| | B-6 Mw = 3000 | — | — | — | — | 100 | 100 | 100 |
| Component C | N-β-Aminoethyl-γ-aminopropyltri-methoxysilane (30%) | 1 | 1.5 | 2 | 5 | 5 | 5 | 5 |

TABLE 11-continued

| Formulation for coating composition (parts) | | M-1 | M-2 | M-3 | M-4 | M-5 | M-6 | M-7 |
|---|---|---|---|---|---|---|---|---|
| | Dibutyltin dilaurate (30%) | 0.5 | 0.5 | 0.5 | 1 | 1 | 1 | 1 |
| Component D | Pigment amount*1 | — | — | — | 60 | 60 | 60*2 | 60*3 |

(Note)
*1 Pigment amount is given in terms of parts per 100 parts, on a dry basis, of components (A) + (B).
*2,3 In 60 parts of pirgment, pigment composition is as follows.

| M6 | white (R-820) | 61 wt % |
| | yellow (Dainichiseika) | 22 wt % |
| | black (Dainichiseika) | 17 wt % |
| M7 | white (R-820) | 77 wt % |
| | yellow (Dainichiseika) | 13 wt % |
| | black (Dainichiseika) | 5 wt % |
| | brown (Dainichiseika) | 5 wt % |

TABLE 12

| | Coating composition | | | Film property | | |
|---|---|---|---|---|---|---|
| | Primer | inter-coat | top-coat | Crosscut tape test | Warm water resistance | Weather-ability |
| Ex. 36 | P-1 | M-4 | — | 100/100 | good | good |
| Ex. 37 | P-2 | M-4 | M-1 | 100/100 | good | good |
| Ex. 38 | P-2 | M-5 | M-2 | 100/100 | good | good |
| Ex. 39 | P-3 | M-5 | M-3 | 100/100 | good | good |
| Ex. 40 | P-4 | M-4 | M-1 | 100/100 | good | good |
| Ex. 41 | P-5 | M-5 | M-2 | 100/100 | good | good |
| Comparative Ex. 7 | — | M-4 | M-1 | 100/100 | mostly peeled | mostly peeled |

EXAMPLE 42

Primer P-1 was applied on the above-described "Multi-siding" by air spraying at a film thickness of 10 μm, and then treated at 60° C. for 30 minutes.

Thereafter, coating composition M-4 was applied on the primer layer by air spraying at a film thickness of 10 μm, and then treated at 60° C. for 30 minutes. On this coating film, coating composition M-1 was applied by air spraying at a film thickness of 8 μm and then treated at 60° C. for 30 minutes.

COMPARATIVE EXAMPLE 8

Primer P-1 was applied on the above-described "Multi-siding" by air spraying at a film thickness of 10 μm, and then treated at 60° C. for 30 minutes.

Thereafter, coating composition C-1 was applied on the primer layer by air spraying at a film thickness of 10 μm, and then treated at 130° C. for 30 minutes. On this coating film, coating composition C-3 was applied by air spraying at a film thickness of 8 μm and then treated at 130° C. for 30 minutes.

With respect to each of the coated inorganic hardened boards obtained in Example 42 and Comparative Example 8, the part encircled by an alternate long and short dash line in FIG. 3 was inspected. As a result, the substrate in Comparative Example 8 was found to have cracked, whereas that in Example 42 had undergone no change.

The following are examples of the present invention in which a plurality of coating layers are formed for imparting a high-grade appearance to the inorganic hardened product.

EXAMPLES 43 AND 44

To 100 parts of the component (A) (A-6) shown in Table 11 was added 60 parts of pigment No. 1 or No. 2 shown below, thereby to prepare pigmented coating compositions M-6 and M-7. The pigment dispersion was conducted by a treatment with a sand mill for 60 minutes.

Pigment No. 1

White pigment (manufactured by Ishihara Sangyo Co., Ltd.): 61%
Yellow pigment (manufactured by Dainichiseika Color & Chemicals Mfg. Co., Ltd., Japan): 22%
Black pigment (manufactured by Dainichiseika Color & Chemicals Mfg. Co., Ltd.): 17%

Pigment No. 2

White pigment (manufactured by Ishihara Sangyo Co., Ltd.): 77%
Yellow pigment (manufactured by Dainichiseika Color & Chemicals Mfg. Co., Ltd.): 13%
Black pigment (manufactured by Dainichiseika Color & Chemicals Mfg. Co., Ltd.): 5%
Brown pigment (manufactured by Dainichiseika Color & Chemicals Mfg. Co., Ltd.): 5%

Further, the above pigment No. 1 was added to primer P-1 shown in Table 10 to prepare a pigmented primer composition. That is, pigment No. 1 was added to S-1 in an amount of 25 parts per 100 parts, on a dry basis, of the vehicle in P-1, and the pigment was dispersed by treatment with a sand mill for 60 minutes. This pigmented primer composition is called P-G.

EXAMPLE 45

The above-described "Multi-siding" was used as an inorganic hardened product. Primer P-G was applied on this substrate by air spraying at a film thickness of 20 μm, and then treated at 50° C. for 30 minutes.

Coating composition M-7 was applied on the projected parts of the primer layer by roll coating at a film thickness of 10 μm, and then treated at 50° C. for 30 minutes. On this coating film, coating composition M-1 was applied by air spraying at a film thickness of 10 μm and then treated at 60° C. for 30 minutes.

As a result, a glossy appearance was obtained, with the projected parts showing a color different from that of the depressed parts. The substrate did not suffer cracking etc. Further, good results were obtained also with respect to the same performance evaluations as described above.

EXAMPLE 46

The above-described "Multi-siding" was used as an inorganic hardened product. Primer P-1 was applied on this substrate by air spraying at a film thickness of 10 μm, and then treated at 50° C. for 30 minutes.

Coating composition M-6 was applied on the projected parts of the primer layer by roll coating at a film thickness of 10 μm, and then treated at 50° C. for 30 minutes. Further, coating composition M-7 was applied on the M-6 coating film by air spraying at a film thickness of 10 μm, and then treated at 40° C. for 15 minutes. On this coating film, coating composition M-1 was applied by air spraying at a film thickness of 10 μm and then treated at 60° C. for 30 minutes.

As a result, a glossy appearance was obtained, with the projected parts showing a color different from that of the depressed parts. The substrate did not suffer cracking etc. Further, good results were obtained also with respect to the same performance evaluations as described above.

While the invention has been described in detail and with reference to specific embodiments thereof, it will be apparent to one skilled in the art that various changes and modifications can be made therein without departing from the spirit and scope thereof.

What is claimed is:

1. A coating composition comprising the following components (A) to (C);
   (A) an organosilane oligomer solution containing silica particles dispersed therein, said solution being obtained by partially hydrolyzing a hydrolyzable organosilane represented by the formula $$R^1{}_n SiX_{4-n} \qquad (I)$$

wherein $R^1$ which may be the same or different each represents a substituted or substituted monovalent hydrocarbon group having 1 to 8 carbon atoms, n is an integer of from 0 to 3, and X represents a hydrolyzable group, said partially hydrolyzing of said organosilane being in the presence of colloidal silica dispersed in an organic solvent or water,
   (B) a polyorganosiloxane having a silanol group in the molecule thereof, represented by the average composition formula $$R^2{}_a Si(OH)_b O_{(4-a-b)/2} \qquad (II)$$

wherein $R^2$ which may be the same or different each represents a substituted or unsubstituted monovalent hydrocarbon group having 1 to 8 carbon atoms, and a and b are numbers satisfying the following equations:

$$0.2 \leq a \leq 2$$

$$0.0001 \leq b \leq 3$$

$$a+b<4, \text{ and}$$

(C) a catalyst

2. A coating composition as claimed in claim 1, wherein component (A) is an organosilane oligomer solution containing silica particles dispersed therein which has been obtained by partially hydrolyzing the hydrolyzable organosilane using 0.001 to 0.5 mol of water per mol of the X group in the hydrolyzable organosilane.

3. A coating composition as claimed in claim 1, wherein component (A) has a solid silica content of from 5 to 95% by weight.

4. A coating composition as claimed in claim 1, wherein at least 50 mol% of the hydrolyzable organosilane is an organosilane or organosilanes which is or are represented by the formula (I) wherein n is 1.

5. A coating composition as claimed in claim 1, wherein the amounts of components (A) and (B) are from 1 to 99 parts by weight and from 99 to 1 parts by weight, respectively, the sum of components (A) and (B) being 100 parts by weight.

6. A coating composition as claimed in claim 1, which further contains a pigment.

7. A coating composition as claimed in claim 6, wherein component (B) has a weight-average molecular weight of from 700 to 20,000 in terms of the weight-average molecular weight of polystyrene.

8. A coating composition as claimed in claim 1, wherein component (A) has a pH of from 2.0 to 7.0.

9. A coating composition as claimed in claim 1, wherein X is selected from the group consisting of an alkoxy group, acetoxy group,
   an oxime group
   an enoxy group
   an amino group, an aminoxy group
   and
   an amido group
   wherein R, R' and R" each represents hydrogen or a monovalent hydrocarbon group.

10. A coating composition as claimed in claim 1, wherein X is an alkoxy group.

* * * * *